US011656073B2

(12) United States Patent
Ueno et al.

(10) Patent No.: US 11,656,073 B2
(45) Date of Patent: May 23, 2023

(54) OPTICAL DEFLECTOR PARAMETER MEASUREMENT DEVICE, METHOD, AND PROGRAM

(71) Applicant: NIPPON TELEGRAPH AND TELEPHONE CORPORATION, Tokyo (JP)

(72) Inventors: Masahiro Ueno, Tokyo (JP); Soichi Oka, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 92 days.

(21) Appl. No.: 17/293,706

(22) PCT Filed: Dec. 2, 2019

(86) PCT No.: PCT/JP2019/046962
§ 371 (c)(1),
(2) Date: May 13, 2021

(87) PCT Pub. No.: WO2020/129584
PCT Pub. Date: Jun. 25, 2020

(65) Prior Publication Data
US 2021/0404908 A1   Dec. 30, 2021

(30) Foreign Application Priority Data
Dec. 17, 2018   (JP) .............................. JP2018-235207

(51) Int. Cl.
*G01B 11/26*   (2006.01)
*G01J 9/02*   (2006.01)
(Continued)

(52) U.S. Cl.
CPC ............ *G01B 11/26* (2013.01); *G01J 9/0246* (2013.01); *G01M 11/0207* (2013.01); *G01B 9/02004* (2013.01); *G01B 2290/60* (2013.01)

(58) Field of Classification Search
CPC ............... G01B 9/02004; G01B 11/26; G01B 2290/60; G01M 11/0207; G01J 9/0246
See application file for complete search history.

(56) References Cited

U.S. PATENT DOCUMENTS

| 4,737,798 A * | 4/1988 | Lonis ................... H01S 5/0607 372/24 |
| 5,973,786 A * | 10/1999 | Yoon .................. G01B 9/02083 356/521 |
| 2006/0119857 A1* | 6/2006 | Steffens ............. G01B 9/02007 356/477 |

FOREIGN PATENT DOCUMENTS

| CN | 107917680 A | * | 4/2018 | ............. G01B 11/26 |
| JP | 2011085610 A | * | 4/2011 | |
| JP | 2016065719 A | * | 4/2016 | |

OTHER PUBLICATIONS

Kodaira, Tohru, "Optical sweep method position measurement system applying wavelength sweep technology," Japan Optomechatronics Association, Optical Technology Contact, vol. 55, No. 8, Aug. 20, 2017, 27 pages.

* cited by examiner

*Primary Examiner* — Michael A Lyons
(74) *Attorney, Agent, or Firm* — Slater Matsil, LLP

(57) ABSTRACT

A parameter measurement device of a light deflector includes a photodetector that receives output light from the light deflector, a biaxial translation automatic stage that moves the photodetector to a plurality of positions, and a signal processing device that calculates the wavelength of the output light of a wavelength sweeping light source for each time, calculates the wavelength of the light received from the light deflector by the photodetector based on the output signal of the photodetector and a previously-calculated wavelength, and calculates the incident angle of the output light beam of the wavelength sweeping light source (Continued)

onto the diffraction grating and an angle formed by an L-axis and a line perpendicular to the surface of the diffraction grating by performing fitting so that the coordinates of the photodetector that are obtained for each position of the photodetector and the wavelength of the light conform to a prescribed relational expression.

9 Claims, 19 Drawing Sheets

(51) Int. Cl.
    *G01M 11/02*     (2006.01)
    *G01B 9/02004*     (2022.01)

OPTICAL DEFLECTOR PARAMETER MEASUREMENT DEVICE, METHOD, AND PROGRAM

This patent application is a national phase filing under section 371 of PCT/JP2019/046962, filed Dec. 2, 2019, which claims the priority of Japanese patent application no. 2018-235207, filed Dec. 17, 2018, each of which is incorporated herein by reference in its entirety.

TECHNICAL FIELD

The present invention relates to a light deflector parameter measurement device, a method, and a program that measure the parameters of a light deflector that changes the emission angle of output light from a diffraction grating according to the wavelength of the output light of a wavelength sweeping light source that is incident onto the diffraction grating.

BACKGROUND

Non-Patent Literature 1 describes a light deflector that causes a light beam output from a wavelength sweeping light source to be incident onto a diffraction grating and changes the emission angle of the light beam emitted from the diffraction grating (deflects light) according to a diffraction grating equation.

FIG. 21 shows an example of the light deflector. A light deflector 100 includes a fiber collimator 101 and a diffraction grating 102. The output light of a wavelength sweeping light source 103 is made into a light beam through the fiber collimator 101 and incident onto the diffraction grating 102 at an incident angle $\alpha$. The light beam diffracted by the diffraction grating 102 is emitted at an emission angle $\beta$ according to a diffraction grating equation. At this time, the emission angle $\beta$ is represented by the following expression.

Expression 1

$$\beta = \sin^{-1}(\sin \alpha - Nm\lambda(t)) \quad (1)$$

Here, N represents the number of the ruled lines of the diffraction grating 102, m represents a diffraction order, and t represents time. The output light of the wavelength sweeping light source 103 is represented by a time function such as $\lambda(t)$ since a wavelength $\lambda$ fluctuates with time.

It appears from expression (1) that the emission angle $\beta$ of the diffraction grating 102 fluctuates (deflects) with time as the wavelength $\lambda$ fluctuates with time. As described above, there is the light deflector that deflects a light beam with the diffraction grating 102 using the time change of the wavelength $\lambda$ of the wavelength sweeping light source 103.

In the light deflector 100 shown in FIG. 21, it is necessary to exactly determine the incident angle $\alpha$ of the output light beam of the wavelength sweeping light source 103 onto the diffraction grating 102 in order to exactly find the emission angle $\beta$ with respect to the time t as is clear from expression (1). As a specific method, it is presumed that the accuracy of the incident angle $\alpha$ is improved with a graduated stage or the like. However, due to the deviation of a jig, the contraction of adhesive, or the like used to fix the fiber collimator 101, there is a case that the incident angle $\alpha$ is deviated from its default. The same applies to the jig or the adhesive used to fix the diffraction grating 102.

When a position deviation or an angle deviation occurs after the installation of an optical component (the fiber collimator 101) and the diffraction grating 102 that emit the light beam of the wavelength sweeping light source, the incident angle $\alpha$ of the light beam onto the diffraction grating 102 is deviated from its assumed angle. Therefore, the emission angle $\beta$ of the light beam from the diffraction grating 102 is deviated from its assumed angle. As a result, the relationship between the time t and the emission angle $\beta$ is deviated from its assumed relationship.

CITATION LIST

Non Patent Literature

[NPL 1] Toni Kodaira, Shogo Yagi, Kazuo Fujiura, Jiro Mori, and Takeshi Watanabe, "Hatyôsôin Gizyutu wo Ôyôsita Hikari Sôin Hôsiki Iti Keisoku Sisutemu (Light Sweeping Position Measurement System with Application of Wavelength Sweeping Technology)", Optical and electro-optical engineering contact, Japan Optomechatronics Association, vol. 55, No. 8, pp. 18-27, issued on Aug. 20, 2017.

SUMMARY

Technical Problem

Embodiments of the present invention have been made in order to solve the above problem and has an object of providing a light deflector parameter measurement device, a method, and a program that can exactly measure the incident angle of the output light beam of the wavelength sweeping light source of a light deflector on a diffraction grating.

Means for Solving the Problem

Embodiments of the present invention provide a light deflector parameter measurement device that measures a parameter of a light deflector that changes an emission angle of output light from a diffraction grating according to a wavelength of the output light of a wavelength sweeping light source that is incident onto the diffraction grating, the device including: a first photodetector that receives the output light from the light deflector; a stage that moves the first photodetector to a plurality of positions along a direction of a first axis perpendicular to a groove direction of the diffraction grating of the light deflector; a first wavelength calculation unit that calculates the wavelength of the output light of the wavelength sweeping light source of the light deflector for each time; a second wavelength calculation unit that calculates a wavelength of the light received from the light deflector by the first photodetector positioned by the stage on the basis of an output signal of the first photodetector and the wavelength calculated by the first wavelength calculation unit; and a parameter calculation unit that calculates an incident angle $\alpha$ of the output light beam of the wavelength sweeping light source onto the diffraction grating and an angle $\theta_G$, which is formed by a second axis that is perpendicular to the groove direction of the diffraction grating and perpendicular to the first axis and a line perpendicular to a surface of the diffraction grating, by performing fitting so that coordinates of the first photodetector that are obtained for each position of the first photodetector positioned by the stage and the wavelength calculated by the second wavelength calculation unit conform to a prescribed relational expression.

In addition, a configuration example of the light deflector parameter measurement device according to embodiments of the present invention further includes a deflection origin calculation unit that calculates coordinates of a deflection origin of the light deflector, wherein the relational expression is an expression in which the coordinates of the first photodetector, the wavelength of the output light from the light deflector, the incident angle α, the angle $\theta_G$, the coordinates of the deflection origin of the light deflector, the number of ruled lines of the diffraction grating, and a diffraction order are associated with each other, the stage moves, before moving the first photodetector along the direction of the first axis to find the incident angle α and the angle $\theta_G$, the first photodetector to move along the first axis and the second axis so that a plurality of the coordinates of the first photodetector can be acquired with respect to one deflection angle of the light deflector for each different deflection angle, and the deflection origin calculation unit finds linear approximations obtained from the plurality of the coordinates of the first photodetector with respect to the same deflection angle of the light deflector for each deflection angle and calculates coordinates of an intersecting point of the linear approximations as the coordinates of the deflection origin of the light deflector.

In addition, a configuration example of the light deflector parameter measurement device according to embodiments of the present invention further includes a wavelength acquisition optical system for acquiring the wavelength of the output light of the wavelength sweeping light source, wherein the wavelength acquisition optical system includes a coupler that distributes the light from the wavelength sweeping light source, an interferometer that receives one output light of the coupler and outputs an interference signal by causing light that propagates through two optical paths having a different optical length to interfere with each other, a wavelength filter that causes light having a specific wavelength of the other output light of the coupler to pass therethrough, and a second photodetector that outputs a signal obtained by photoelectrically converting the light that passes through the wavelength filter as a filter signal, and the first wavelength calculation unit calculates the wavelength of the output light of the wavelength sweeping light source for each time on the basis of the interference signal, the filter signal, and a prescribed maximum transmission wavelength of the wavelength filter.

In addition, in a configuration example of the light deflector parameter measurement device according to embodiments of the present invention, the first wavelength calculation unit is constituted by a phase calculation unit that calculates a phase of the interference signal, a relative wavenumber calculation unit that calculates a relative wavenumber of light from the phase of the interference signal, a peak time acquisition unit that acquires a peak time of the filter signal, an absolute wavenumber calculation unit that calculates an absolute wavenumber from the maximum transmission wavelength of the wavelength filter and the peak time, and a wavelength calculation processing unit that calculates the wavelength of the output light of the wavelength sweeping light source from the absolute wavenumber.

In addition, embodiments of the present invention provide a light deflector parameter measurement method for measuring a parameter of a light deflector that changes an emission angle of output light from a diffraction grating according to a wavelength of the output light of a wavelength sweeping light source that is incident onto the diffraction grating. The method includes a first step of moving a photodetector that receives the output light from the light deflector to a plurality of positions along a direction of a first axis perpendicular to a groove direction of the diffraction grating of the light deflector by a stage; a second step of calculating the wavelength of the output light of the wavelength sweeping light source of the light deflector for each time; a third step of calculating a wavelength of the light received from the light deflector by the photodetector positioned by the stage on the basis of an output signal of the photodetector and the wavelength calculated in the second step; and a fourth step of calculating an incident angle α of the output light beam of the wavelength sweeping light source onto the diffraction grating and an angle $\theta_G$, which is formed by a second axis that is perpendicular to the groove direction of the diffraction grating and perpendicular to the first axis and a line perpendicular to a surface of the diffraction grating, by performing fitting so that coordinates of the photodetector that are obtained for each position of the photodetector positioned by the stage and the wavelength calculated in the third step conform to a prescribed relational expression.

In addition, in a configuration example of the light deflector parameter measurement method according to embodiments of the present invention, the relational expression is an expression in which the coordinates of the photodetector, the wavelength of the output light from the light deflector, the incident angle α, the angle $\theta_G$, the coordinates of the deflection origin of the light deflector, the number of ruled lines of the diffraction grating, and a diffraction order are associated with each other. The method further includes a fifth step of moving, before the first step, the photodetector along the first axis and the second axis so that a plurality of the coordinates of the photodetector can be acquired with respect to one deflection angle of the light deflector for each different deflection angle; and a sixth step of finding a linear approximation obtained from the plurality of the coordinates of the photodetector with respect to the same deflection angle of the light deflector for each deflection angle and calculating coordinates of an intersecting point of the linear approximations as the coordinates of the deflection origin of the light deflector.

In addition, a light deflector parameter measurement program causes a computer to perform the above respective steps.

Effects of Embodiments of the Invention

According to embodiments of the present invention, it is possible to exactly measure the incident angle of an output light beam of the wavelength sweeping light source on a diffraction grating in a light deflector and exactly find the relationship between time and the emission angle of the diffraction grating.

DETAILED DESCRIPTION OF ILLUSTRATIVE EMBODIMENTS

Embodiments

Figure 1:
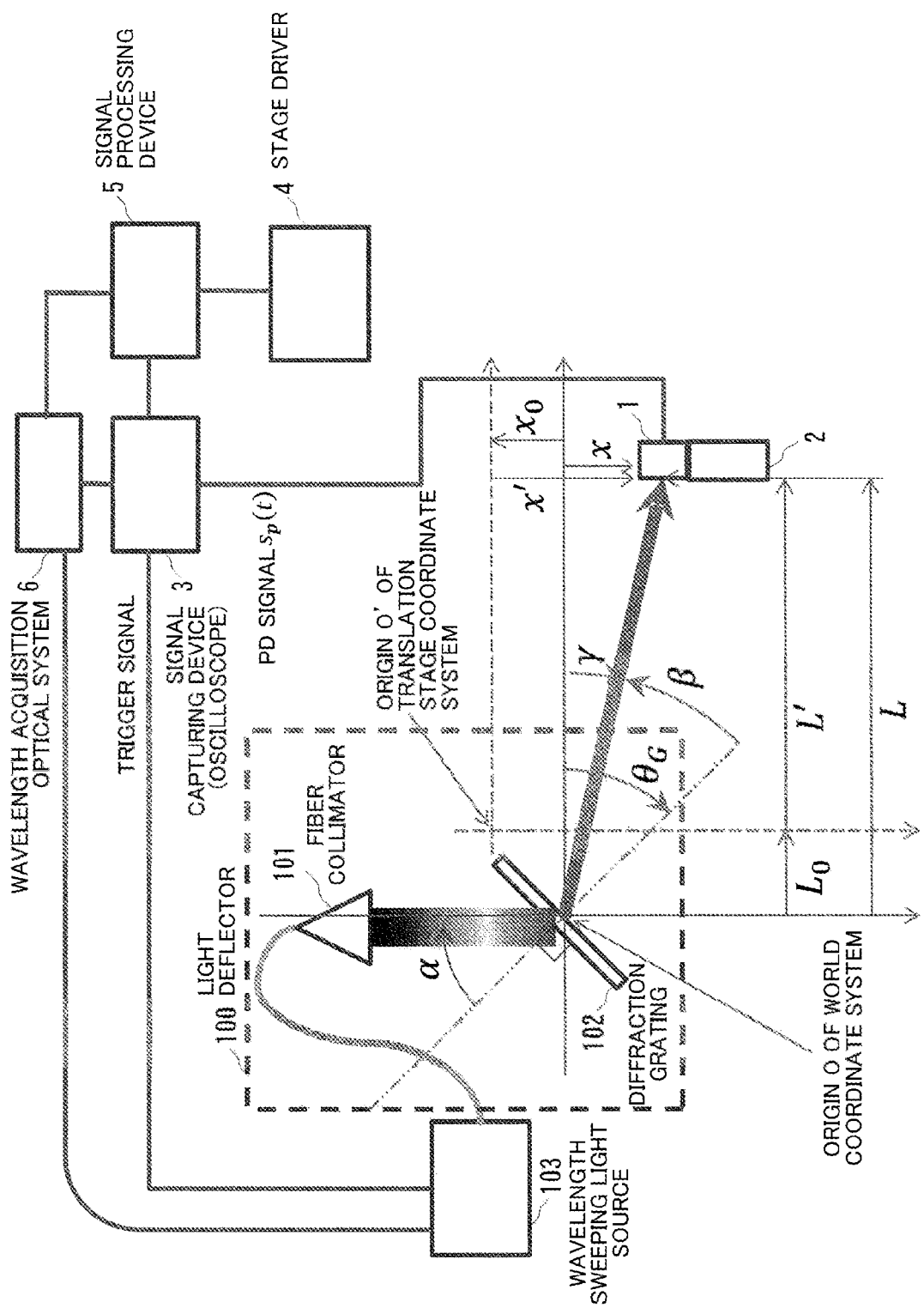
FIG. 1 is a diagram showing the configuration of a light deflector parameter measurement device according to an embodiment of the present invention.

Hereinafter, embodiments of the present invention will be described with reference to the drawings. FIG. 1 is a diagram showing the configuration of a light deflector parameter measurement device according to an embodiment of the present invention. The light deflector parameter measurement device includes a photodetector (hereinafter called a PD) 1 that receives output light from a light deflector wo, a biaxial translation automatic stage 2 that causes the PD 1 to move, a signal capturing device 3 that captures the output signal of the PD 1, a stage driver 4 that drives the biaxial translation automatic stage 2, a signal processing device 5 that performs the control of the whole light deflector parameter measurement device and the calculation of parameters, and a wavelength acquisition optical system 6 that is used to acquire the wavelength of the output light of a wavelength sweeping light source 103.

Figure 2:
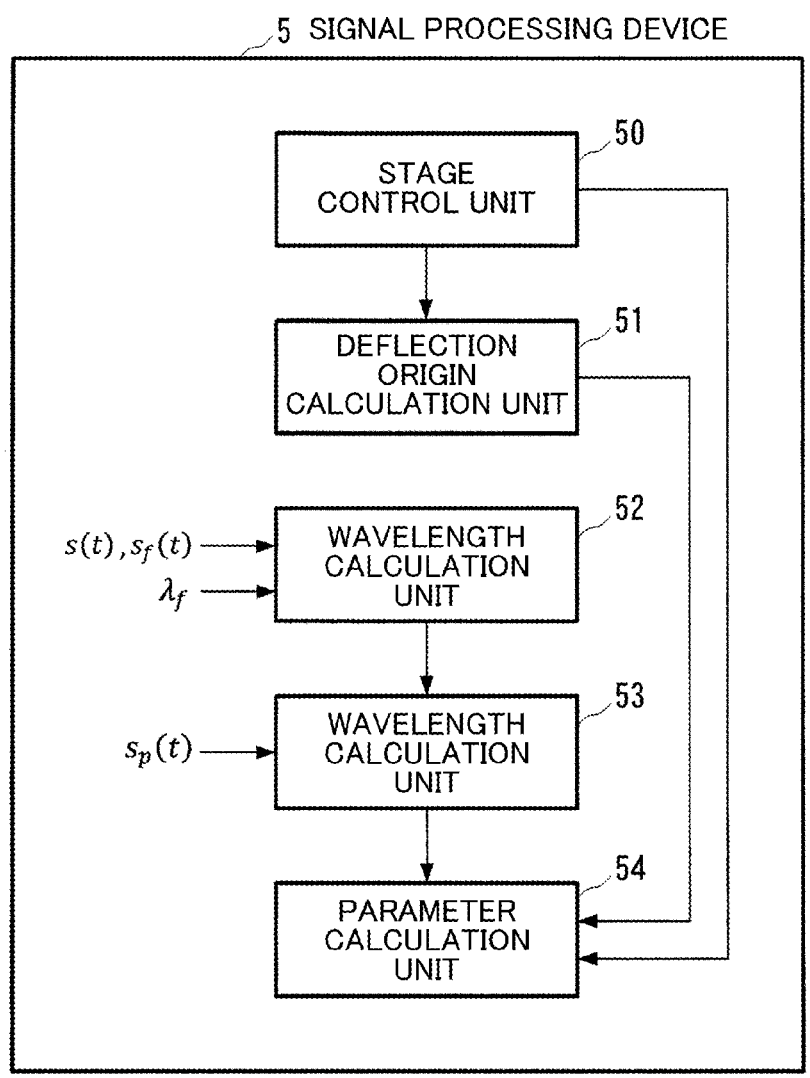
FIG. 2 is a block diagram showing the configuration of the signal processing device of the light deflector parameter measurement device in an embodiment of the present invention.

FIG. 2 is a block diagram showing the configuration of the signal processing device 5 of the light deflector parameter measurement device according to the present embodiment. The signal processing device 5 is constituted by a stage control unit 50 that controls the biaxial translation automatic stage 2 through the stage driver 4, a deflection origin calculation unit 51 that calculates the coordinates of the deflection origin of the light deflector 100, a wavelength calculation unit 52 (first wavelength calculation unit) that calculates the wavelength of the output light of the wavelength sweeping light source 103 of the light deflector 100 for each time, a wavelength calculation unit 53 (second wavelength calculation unit) that calculates the wavelength of light received from the light deflector 100 by the PD 1 positioned by the biaxial translation automatic stage 2, and a parameter calculation unit 54 that calculates an incident angle α of the output light beam of the wavelength sweeping light source 103 on a diffraction grating 102 and an angle $\theta_G$ formed by an L-axis that will be described later and a line perpendicular to the surface of the diffraction grating 102.

Figure 3:
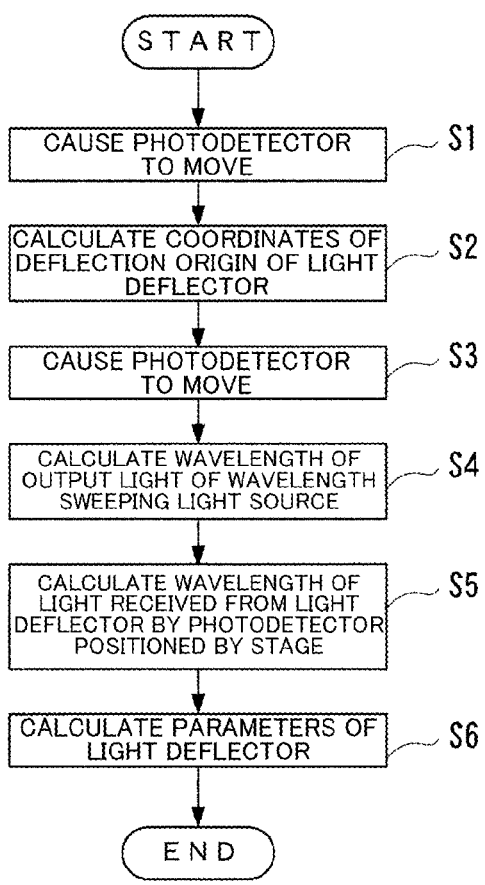
FIG. 3 is a flowchart for describing the operation of the signal processing device of the light deflector parameter measurement device in an embodiment of the present invention.

FIG. 3 is a flowchart for describing the operation of the signal processing device 5. The stage control unit 50 of the signal processing device 5 performs the movement of the PD 1 so that a plurality of the coordinates of the PD 1 can be acquired with respect to one deflection angle β of the light deflector 100 for each different deflection angle through the stage driver 4 (step S1 of FIG. 3).

The deflection origin calculation unit 51 of the signal processing device 5 finds linear approximations acquired from a plurality of the coordinates of the PD 1 with respect to the same deflection angle β of the light deflector 100 for each deflection angle β, and calculates the coordinates of the intersecting point of the linear approximations as the coordinates of the deflection origin of the light deflector 100 (step S2 of FIG. 3). The processing of steps S1 and S2 described above is performed in advance before the calculation of the parameters (an incident angle α and an angle $\theta_G$) of the light deflector.

Next, the stage control unit 50 of the signal processing device 5 causes the PD 1 to move to a plurality of positions along the direction of a first axis perpendicular to the groove direction of the diffraction grating 102 of the light deflector 100 (S3 of FIG. 3).

The wavelength calculation unit 52 of the signal processing device 5 calculates the wavelength of the output light of the wavelength sweeping light source 103 of the light deflector 100 for each time (step S4 of FIG. 3). The calculation of the wavelength of the output light of the wavelength sweeping light source 103 is performed at all times.

The wavelength calculation unit 53 of the signal processing device 5 calculates the wavelength of light received from the light deflector 100 by the PD 1 positioned by the biaxial translation automatic stage 2 on the basis of the output signal of the PD 1 and the wavelengths calculated by the wavelength calculation unit 52 (step S5 of FIG. 3).

The parameter calculation unit 54 of the signal processing device 5 calculates an incident angle α of the output light beam of the wavelength sweeping light source 103 onto the diffraction grating 102 and an angle $\theta_G$ formed by the L-axis that will be described later and the line perpendicular to the surface of the diffraction grating 102 according to a method that will be described below (step S6 of FIG. 3). Here, the parameter calculation unit 54 performs fitting so that the coordinates of the PD 1 acquired for each position of the PD 1 positioned by the biaxial translation automatic stage 2 and the wavelengths calculated by the wavelength calculation unit 53 conform to a prescribed relational expression.

Figure 21:
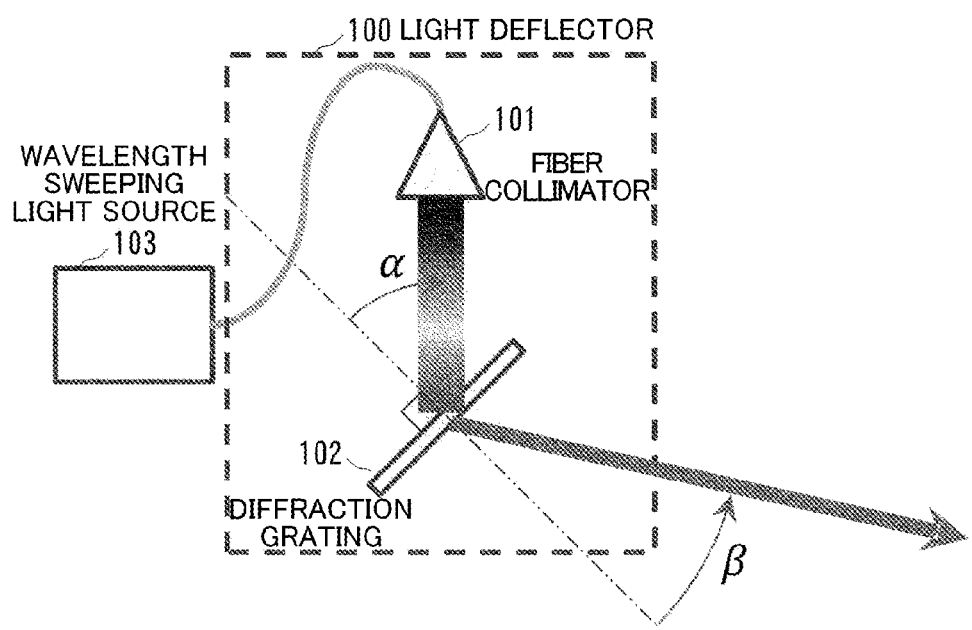
FIG. 21 is a diagram showing the configuration of a conventional light deflector.

Hereinafter, the light deflector parameter measurement device of the present embodiment will be described in further detail. As the wavelength sweeping light source 103 and the light deflector 100 are described above with reference to FIG. 21, α represents the incident angle of a light beam from a fiber collimator 101 onto the diffraction grating 102, β represents the emission angle of the light beam from the diffraction grating 102 (the deflection angle of the light deflector 100), and γ represents the emission angle of the light beam from the light deflector 100 to the PD 1.

FIG. 1 shows the origin and the axes of a world coordinate system, which are defined as follows. First, the origin O of the world coordinate system represents the deflection origin of the light deflector 100. The x-axis (the first axis, i.e., the vertical direction of FIG. 1) of the world coordinate system is an axis that is perpendicular to the groove direction (a direction orthogonal to the space of FIG. 1) of the diffraction grating 102 of the light deflector 100, and that passes through the origin O of the world coordinate system. The L-axis (the second axis, i.e., the horizontal direction of FIG. 1) of the world coordinate system is an axis that is perpendicular to the groove direction of the diffraction grating 102, passes through the origin O of the world coordinate system, and is perpendicular to the x-axis.

A plane containing both the x-axis and the L-axis is determined according to the above conditions, but the x-axis and the L-axis are not uniquely determined. A reason why the x-axis and the L-axis are not uniquely determined will be described later. Note that the light axis of the light beam emitted from the fiber collimator 101 of the light deflector 100 is perpendicular to the groove direction of the diffraction grating 102. At this time, the light deflector 100 deflects inside an x-L plane.

On the other hand, the axes of the stage coordinate system of the biaxial translation automatic stage 2 that causes the PD 1 to move are named as an x'-axis (first axis) and an L'-axis (second axis). It is assumed that the x-axis is parallel to the x'-axis, and that the L-axis is parallel to the L'-axis. That is, when the x'-axis and the L'-axis are determined, the x-axis and the L-axis are determined as axes that pass through the origin O of the world coordinate system, and that are parallel to the x'-axis and the L'-axis, respectively. Even if a user arranges the biaxial translation automatic stage 2 of the x'-axis and the L'-axis in any way, the x-axis and the L-axis are determined according to the arrangement under such a definition. Therefore, the user can freely determine the x-axis and the L-axis to facilitate measurement.

Meanwhile, there is almost no possibility that an origin O' of a two-dimensional coordinate system (an x'-L' coordinate system, i.e., a stage coordinate system) represented by the x'-axis and the L'-axis and the origin O of a two-dimensional coordinate system (an x-L coordinate system, i.e., the world coordinate system) represented by the x-axis and the L-axis exactly match each other. In FIG. 1, the coordinates of the deflection origin of the light deflector 100 (the deviation amount between the origin O and the origin O') are represented by $(L_0, x_0)$.

Note that when the parameters of the light deflector wo are actually measured, the biaxial translation automatic stage 2 is installed so that a surface through which the deflection beam of the light deflector wo passes and a surface along which the PD 1 moves become parallel to each other. At this time, the x-axis of the world coordinate system is parallel to the x'-axis of the biaxial translation automatic stage 2 and is determined as an axis that passes through the origin O of the world coordinate system. That is, the x-axis is uniquely determined when the biaxial translation automatic stage 2 is installed, and the x-axis is changed according to a way in which the biaxial translation automatic stage 2 is installed.

The operations of the signal capturing device 3 that captures the output of the PD 1, the stage driver 4 that causes the biaxial translation automatic stage 2 to operate, and the signal processing device 5 that processes a captured signal will be described later.

When the coordinate system of FIG. 1 is used, the following relationships are established.

Expressions 2, 3, and 4

$$x = L\tan(\theta_G + \sin^{-1}(\sin\alpha - Nm\lambda(t))) \quad (2)$$

$$x = x' + x_0 \quad (3)$$

$$L = L' + L_0 \quad (4)$$

As described above, $\lambda(t)$ represents the wavelength of the output light of the wavelength sweeping light source 103, N represents the number of the ruled lines of the diffraction grating 102, m represents a diffraction order, and t represents time. Further, $\theta_G$ represents an angle (diffraction grating angle) formed by the surface of the diffraction grating 102 and the L-axis.

Where the angles α and $\theta_G$ that represent the parameters of the deflector are found, it is only necessary to determine the angles α and $\theta_G$ so as to establish expression (2) if $N_m$ position coordinates $(L_i, x_i)$ (i=1 to $N_m$) and wavelengths $\lambda_i$ acquirable at the respective positions of the PD 1 can be acquired when the PD 1 is caused to move $N_m$ times. As a method for this, a Newton-Raphson method, a steepest descent method, a Levenberg-Marquardt method, or the like can be used. A method for finding the angles α and $\theta_G$ using $(L_i, x_i, \lambda_i)$ and expression (2) will be described later.

From here, a method for measuring the coordinates $(L_0, x_0)$ of the deflection origin of the light deflector 100 (the deviation amount between the origin O of the world coordinate system and the origin O' of the stage coordinate system) and a method for measuring the wavelength $\lambda(t)$ of the output light of the wavelength sweeping light source 103 will be described as preparations for acquiring the angles α and $\theta_G$ using expression (2).

Figure 4:
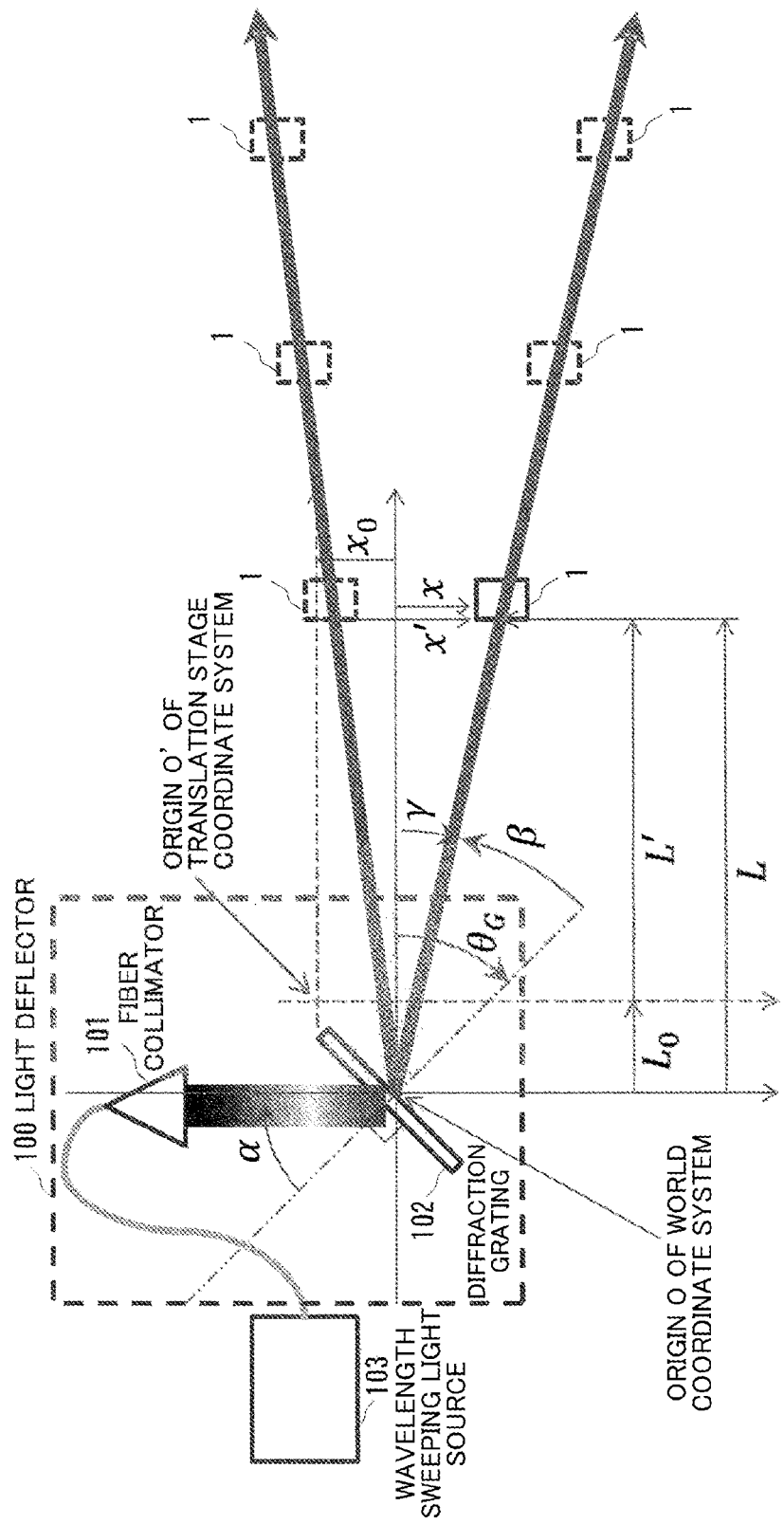
FIG. 4 is a diagram for describing the principle of acquiring the coordinates of the deflection origin of a light deflector in an embodiment of the present invention.

First, the method for acquiring the coordinates $(L_0, x_0)$ of the deflection origin of the light deflector 100 will be described. FIG. 4 shows the principle of acquiring the coordinates $(L_0, x_0)$ of the deflection origin of the light deflector 100. It is assumed that the position coordinates of the PD 1 that receives a light beam from the diffraction grating 102 when the deflection angle of the light deflector 100 (the emission angle of the diffraction grating 102) is $\beta_j$ are $(L'_{j,i}, x'_{j,i})$. Here, j represents a difference in angle, and i represents a difference in position of the PD 1 that receives light at the same deflection angle $\beta_j$.

As shown in FIG. 4, the movement of the PD 1 by the biaxial translation automatic stage (not shown) and the acquisition of a plurality of the position coordinates ($L'_{j,i}$, $x'_{j,i}$) of the PD 1 with respect to one deflection angle $\beta_j$ are performed for each different deflection angle $\beta_j$. When the position coordinates ($L'_{j,i}$, $x'_{j,i}$) with respect to the same deflection angle $\beta_j$ are linearly approximated by a least-squares method or the like using the position coordinates ($L'_{j,i}$, $x'_{j,i}$), lines having different deflection angles $\beta_j$ cross each other at the deflection origin (the origin O of the world coordinate system). Note that the position coordinates ($L'_{j,i}$, $x'_{j,i}$) of the PD 1 can be acquired from the stage control unit 50.

Since an error occurs in the calculation of actual lines, the lines having different deflection angles $\beta_j$ hardly cross each other at one point. However, in such a case, the coordinates of a deflection origin that becomes optimum in terms of a least-squares method can be calculated using a generalized inverse matrix by Moore Penrose. When it is assumed that the coordinates of the deflection origin (the origin O of the world coordinate system) calculated here are ($L'_0$, $x'_0$), ($L'_0$, $x'_0$) are the coordinates of the stage coordinate system and are vectors representing the deviation between the origin O' of the stage coordinate system and the origin O of the world coordinate system. Therefore, the coordinates ($L_0$, $x_0$) of the deflection origin of the light deflector 100 can be calculated as in the following expression.

Expression 5

$$(L_0, x_0) = (L'_0, x'_0) \quad (5)$$

Figure 5:
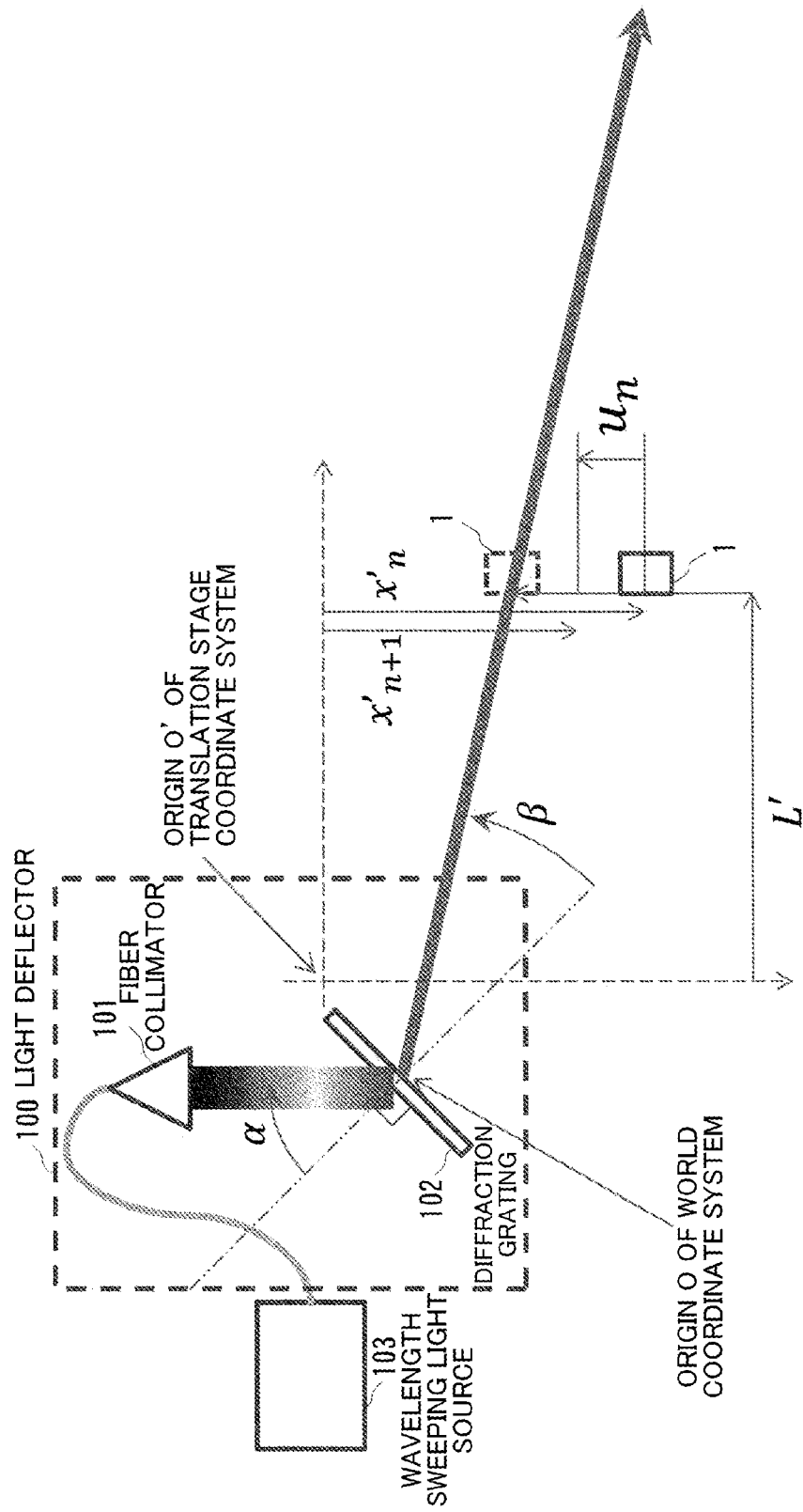
FIG. 5 is a diagram for describing a method for controlling the position of a photodetector in an embodiment of the present invention.

Next, a method for moving the PD 1 so that the light deflector 100 has the same deflection angle $\beta_j$ will be described. FIG. 5 is a diagram for describing a method for controlling the position of the PD 1.

The signal capturing device 3 acquires an output signal $S_p(t)$ of the PD 1 in synchronization with the trigger signal of the wavelength sweeping light source 103 (the synchronization signal of wavelength sweeping).

Figure 6:
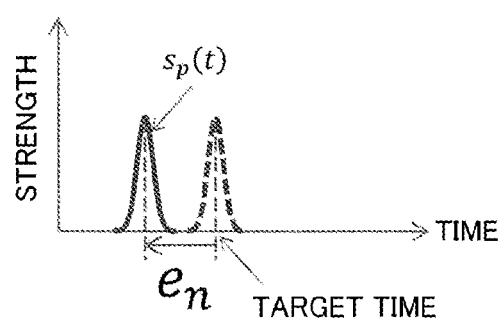
FIG. 6 is a diagram showing the waveform of the output signal of the photodetector in an embodiment of the present invention.

FIG. 6 shows the waveform of the output signal $S_p(t)$ of the PD 1. The stage control unit 50 of the signal processing device 5 acquires a deviation $e_n$ between the peak time of the output signal $S_p(t)$ of the PD 1 that is acquired by the signal capturing device 3 and a target time corresponding to the deflection angle $\beta_j$ of the light deflector 100. Then, the stage control unit 50 calculates a change $u_n$ in operation amount on the x'-axis by PI control computation from the deviation $e_n$. A calculation expression for calculating the change $u_n$ is as follows.

Expression 6

$$u_n = K_p \left( e_n + \frac{1}{T_i} \sum_{q=1}^{n} e_q \right) \quad (6)$$

In expression (6), n represents the number of feedback times, $K_p$ represents a gain, and $T_i$ represents a time constant. The stage control unit 50 obtains the latest operation amount $x'_{n+1}$ under $x'_{n+1} = x'_n + u_n$. $x'_n$ represents an immediately-preceding operation amount. The stage control unit 50 outputs the operation amount $x'_n$, to the stage driver 4. According to the operation amount $x'_{n+1}$, the stage driver 4 controls the biaxial translation automatic stage 2 and causes the PD 1 to move to a position corresponding to the operation amount $x'_{n+1}$ along the x'-axis.

The acquisition of the output signal $S_p(t)$ of the PD 1, the acquisition of the deviation $e_n$, and the PI control of the position of the PD 1 described above are repeatedly performed until the deviation $e_n$ becomes a prescribed value S$\delta$e or less with respect to one position coordinates ($L'_{j,i}$, $x'_{j,i}$) of one deflection angle $\beta_j$.

Figure 7B:
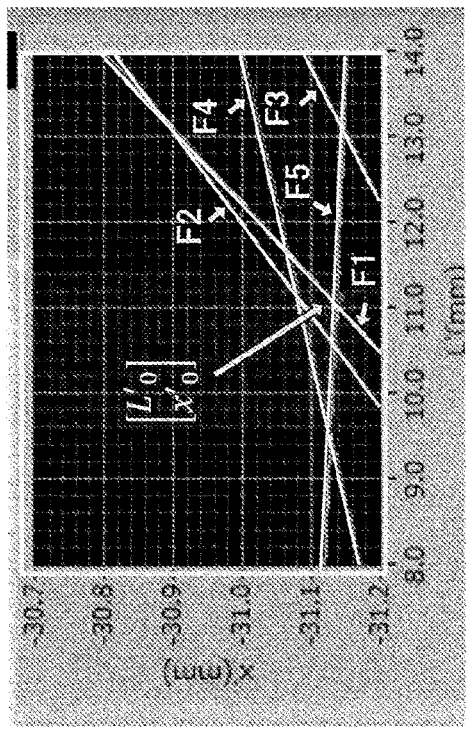
FIGS. 7A and 7B are diagrams showing a measurement result example of the coordinates of the deflection origin (the origin of the world coordinate system) of the light deflector in an embodiment of the present invention.
Figure 7A:
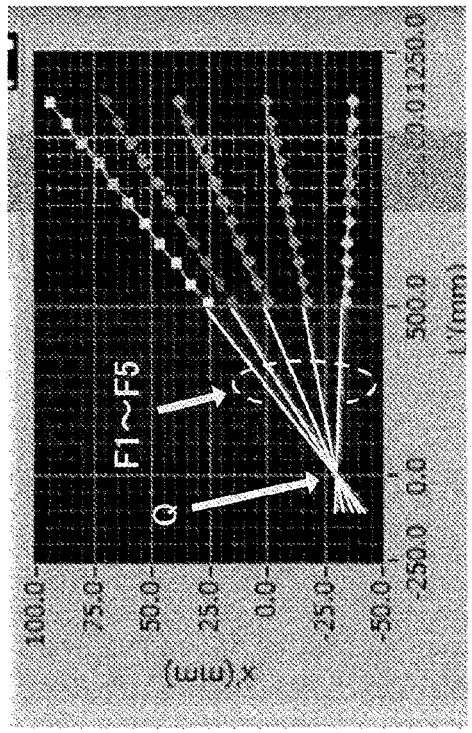

FIGS. 7A and 7B show a measurement result example of the coordinates ($L'_0$, $x'_0$) of the deflection origin (the origin O of the world coordinate system). FIG. 7A shows the whole diagram (corresponding to FIG. 4). FIG. 7B shows the vicinity of the intersecting point (the position of Q of FIG. 7A) of linear approximations obtained when a plurality of position coordinates ($L'_{j,i}$, $x'_{j,i}$) with respect to the same deflection angle $\beta_j$ are linearly approximated by a least-squares method. The horizontal axis and the vertical axis of FIGS. 7A and 7B are L' and x', respectively.

FIGS. 7A and 7B show five linear approximations F1 to F5 obtained for five different deflection angles $\beta_j$. Further, measurement data on the right side of FIG. 7A shows a plurality of position coordinates ($L'_{j,i}$, $x'_{j,i}$) for each deflection angle $\beta_j$. Note that in the example of FIGS. 7A and 7B, the coordinates x' are acquired at five time points for each coordinates L', and the measurement data of position coordinates ($L'_{j,i}$, $x'_{j,i}$) is acquired for 55 points in total while the coordinates L' are changed 10 times. The following expression is obtained from the five linear approximations F1 to F5.

Expression 7

$$A \begin{bmatrix} L'_0 \\ x'_0 \end{bmatrix} = b \quad (7)$$

Here, A represents a matrix, and b represents a column vector. The number of the columns of the matrix A is two, and the number of the rows thereof corresponds to the number of lines. Since there are the five linear approximations in the example of FIGS. 7A and 7B, the number of the rows of the matrix A is five in the case of this example. The number of the elements of the column vector b corresponds to the number of linear approximations. Since there are the five linear approximations in the example of FIGS. 7A and 7B, the number of the elements of the column vector b is five in the case of this example. As shown in FIG. 7B, the linear approximations F1 to F5 do not cross each other at one point.

The deflection origin calculation unit 51 of the signal processing device 5 finds the coordinates ($L'_0$, $x'_0$) of the stage coordinate system as shown in the following expression using a Moore-Penrose generalized inverse matrix $(A^T A)^{-1} A^T$ from the linear approximations F1 to F5 and inverts the positive and negative codes of the coordinates ($L'_0$, $x'_0$) of the stage coordinate system to calculate the coordinates ($L_0$, $x_0$) of the deflection origin of the light deflector 100 (the deviation amount between the origin O of the world coordinate system and the origin O' of the stage coordinate system).

Expression 8

$$\begin{bmatrix} L'_0 \\ x'_0 \end{bmatrix} = (A^T A)^{-1} A^T b \quad (8)$$

In the example of FIGS. 7A and 7B, the specific calculation result of the coordinates ($L_0$, $x_0$) of the deflection origin of the light deflector 100 is as follows.

Expression 9

$$\begin{bmatrix} L_0 \\ x_0 \end{bmatrix} = -\begin{bmatrix} L'_0 \\ x'_0 \end{bmatrix} = \begin{bmatrix} 31.1404 \\ -11.1295 \end{bmatrix} \quad (9)$$

Next, the method for acquiring the wavelength $\lambda(t)$ of the output light of the wavelength sweeping light source 103 will be described. When the wavelength $\lambda(t)$ of the output light of the wavelength sweeping light source 103 is known in advance, processing to calculate the parameters $\alpha$ and $\theta_G$ of the light deflector using expression (2) can be performed. However, when the wavelength $\lambda(t)$ is unknown or when the wavelength $\lambda(t)$ fluctuates with a change in environment such as temperature and humidity, the wavelength $\lambda(t)$ has to be acquired.

Figure 8:
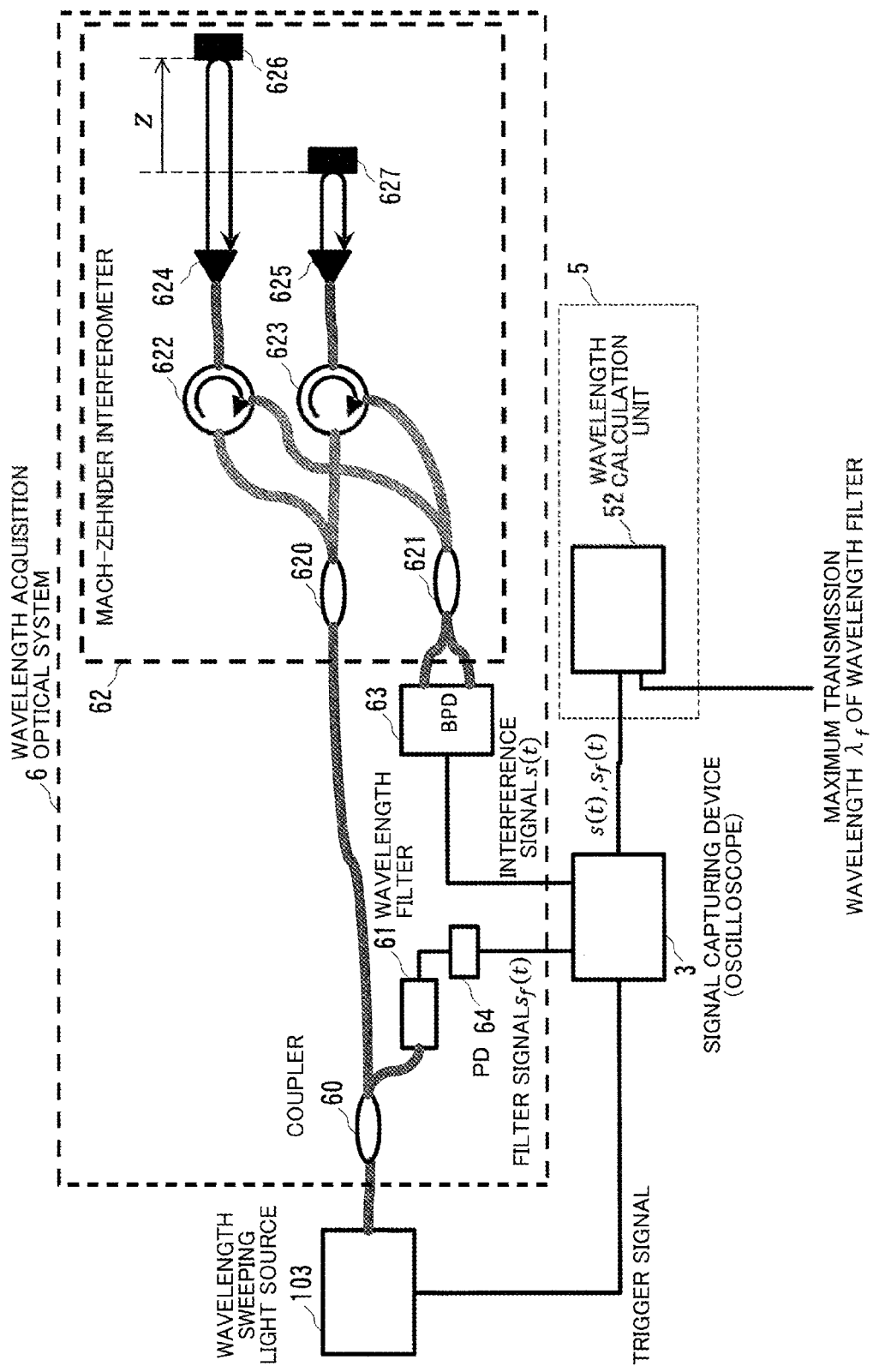
FIG. 8 is a diagram showing the configuration of a wavelength acquisition optical system in an embodiment of the present invention.

FIG. 8 shows the configuration of the wavelength acquisition optical system 6. The wavelength acquisition optical system 6 is constituted by a coupler 60, a wavelength filter 61, a photodetector (PD) 64, a Mach-Zehnder interferometer 62, and a balanced photodetector (BPD) 63. The Mach-Zehnder interferometer 62 is constituted by couplers 620 and 621, circulators 622 and 623, prisms 624 and 625, and mirrors 626 and 627.

It is possible to add the wavelength acquisition optical system 6 to the measurement system shown in FIGS. 1 and 4. In this case, it is only necessary to insert a coupler (not shown) between the wavelength sweeping light source 103 and the light deflector 100 of FIG. 1 and input one and the other light out of light bifurcated by the coupler to the light deflector 100 and the wavelength acquisition optical system 6, respectively.

The coupler 60 of the wavelength acquisition optical system 6 distributes the light from the wavelength sweeping light source 103. Out of the light, one light from the coupler 60 is incident on the wavelength filter 61, and the other light is incident on the Mach-Zehnder interferometer 62.

The wavelength filter 61 is a band-pass filter that causes light having a specific wavelength to selectively pass therethrough. The PD 64 photoelectrically converts the light having passed through the wavelength filter 61 and outputs an electric signal (filter signal) $S_f(t)$.

The Mach-Zehnder interferometer 62 has two optical paths having an optical path length difference of 2z. The BPD 63 outputs an interference signal s(t) by finding the difference between two electric signals obtained by photoelectrically converting the light interfered by the coupler 621 after having propagated through the two optical paths of the Mach-Zehnder interferometer 62.

The signal capturing device 3 acquires the interference signal s(t) from the BPD 63 and the filter signal $S_f(t)$ from the wavelength filter 61 in synchronization with the trigger signal of the wavelength sweeping light source 103 (the synchronization signal of wavelength sweeping). The wavelength calculation unit 52 of the signal processing device 5 calculates the wavelength $\lambda(t)$ of the output light of the wavelength sweeping light source 103 on the basis of the interference signal s(t), the filter signal $S_f(t)$, and a prescribed maximum transmission wavelength $\lambda_f$ of the wavelength filter 61.

Figure 9:
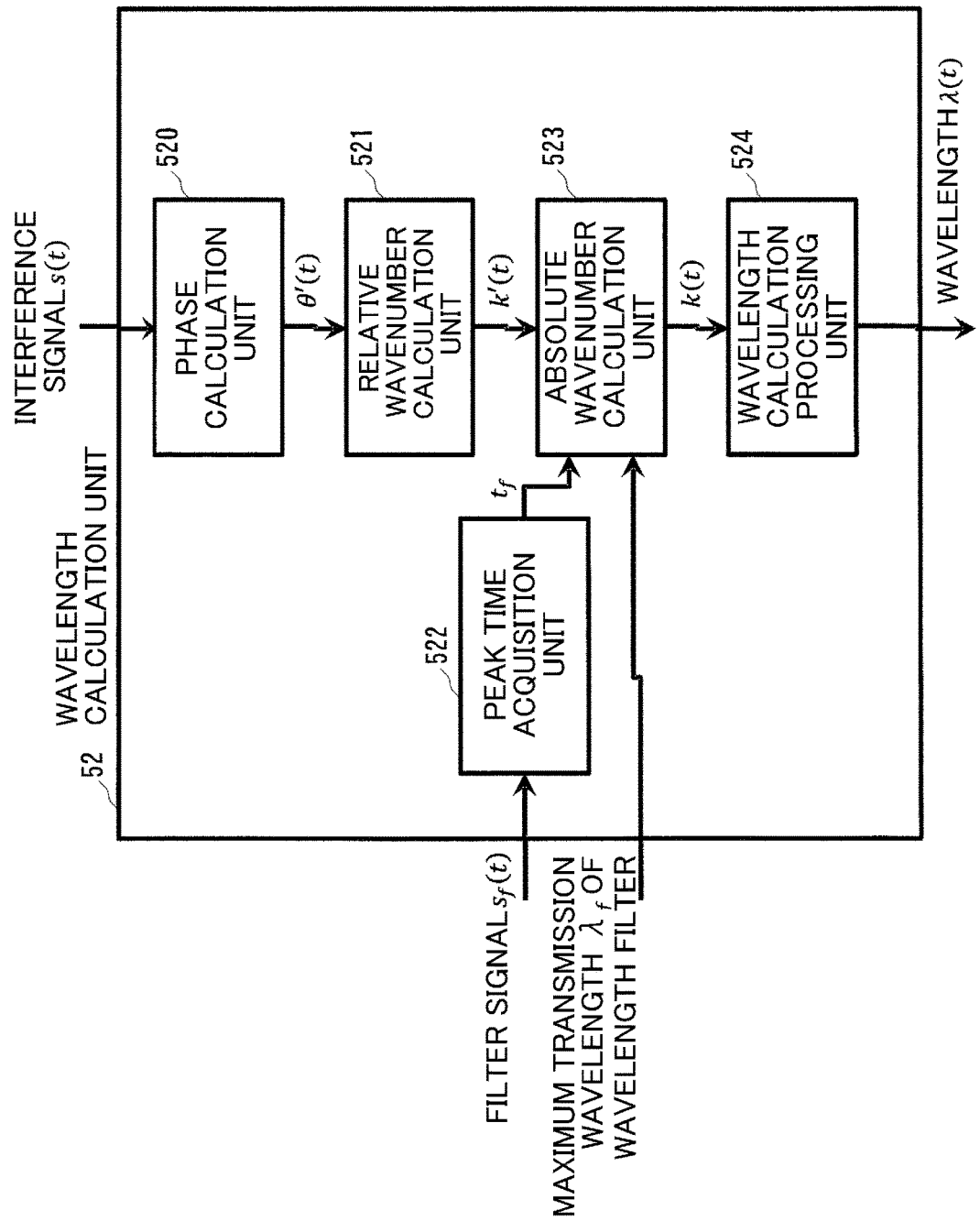
FIG. 9 is a diagram showing the configuration of the first wavelength calculation unit of the signal processing device in an embodiment of the present invention.
Figure 10:
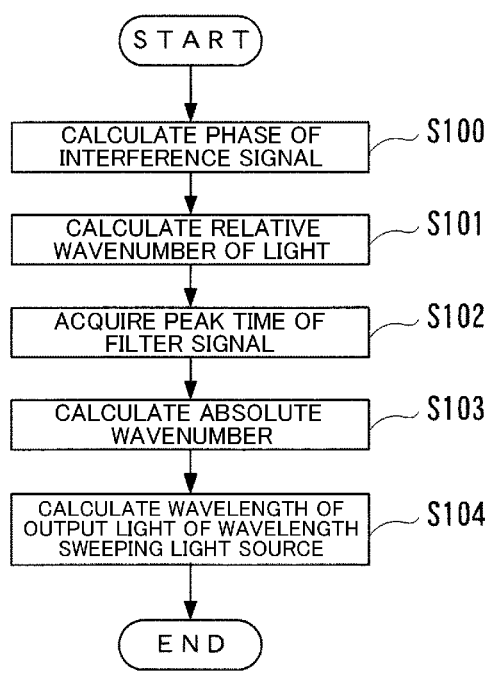
FIG. 10 is a flowchart for describing the operation of the first wavelength calculation unit of the signal processing device in an embodiment of the present invention.

FIG. 9 shows the configuration of the wavelength calculation unit 52. The wavelength calculation unit 52 is constituted by a phase calculation unit 520, a relative wavenumber calculation unit 521, a peak time acquisition unit 522, an absolute wavenumber calculation unit 523, and a wavelength calculation processing unit 524. FIG. 10 is a flowchart for describing the operation of the wavelength calculation unit 52.

First, the phase calculation unit 520 calculates a phase $\theta'(t)$ of the interference signal s(t) (step S100 of FIG. 10).

The relative wavenumber calculation unit 521 calculates a relative wavenumber k'(t) of light from the phase $\theta'(t)$ (step S101 of FIG. 10).

The peak time acquisition unit 522 acquires a peak time $t_f$ of the filter signal $s_f(t)$ (step S102 of FIG. 10).

The absolute wavenumber calculation unit 523 calculates an absolute wavenumber k(t) from the maximum transmission wavelength $\lambda_f$ of a wavelength filter and the peak time $t_f$ (step S103 of FIG. 10).

Then, the wavelength calculation processing unit 524 calculates the wavelength $\lambda(t)$ from the wavenumber k(t) (step S104 of FIG. 10).

Figure 11:
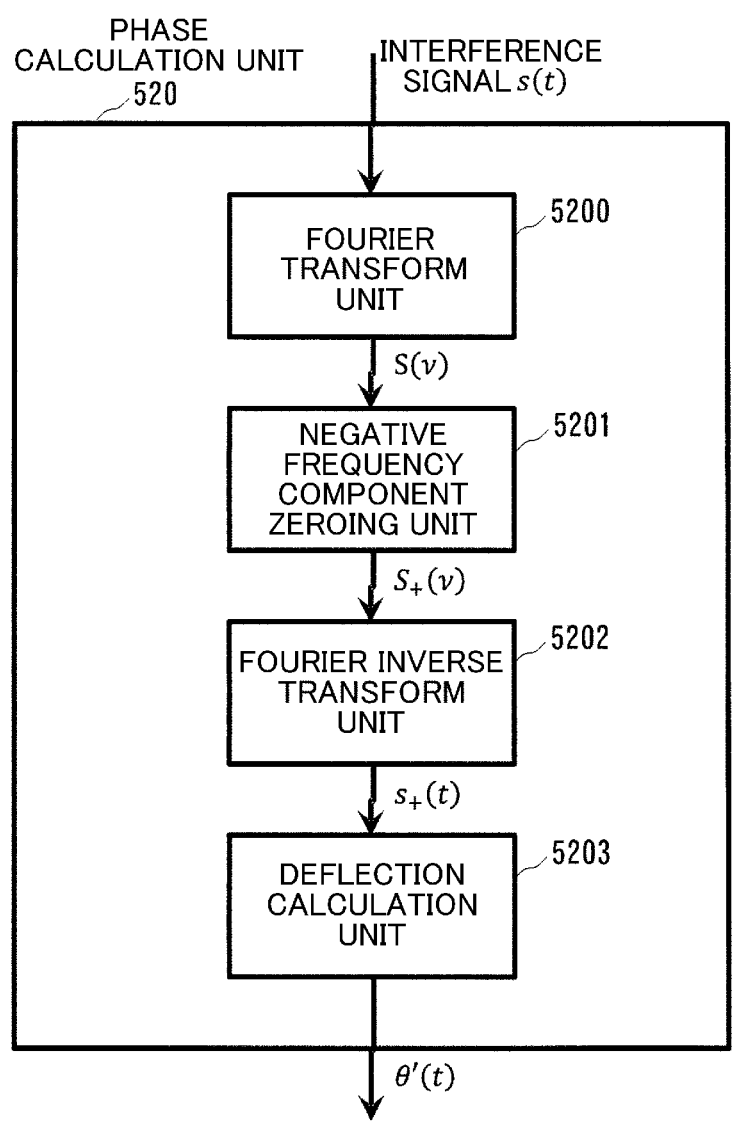
FIG. 11 is a diagram showing the configuration of the phase calculation unit of the wavelength calculation unit in an embodiment of the present invention.
Figure 12:
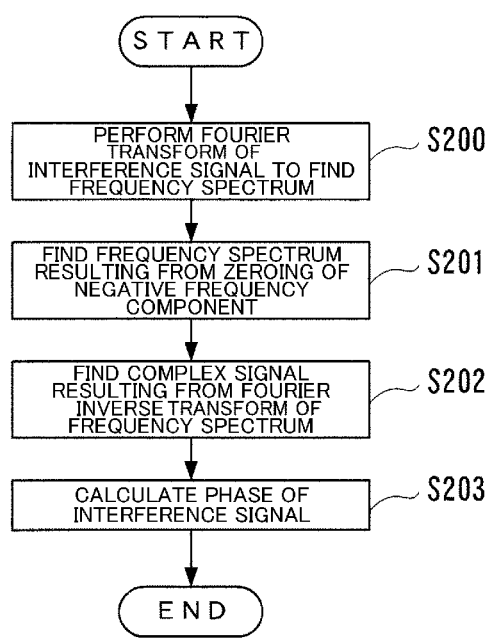
FIG. 12 is a flowchart for describing the operation of the phase calculation unit of FIG. 11.

First, the phase calculation unit 520 that calculates the phase $\theta'(t)$ from the interference signal s(t) obtained from the Mach-Zehnder interferometer 62 will be described. FIG. 11 is a diagram showing the configuration of the phase calculation unit 520 in a case in which Fourier transform is used. In this case, the phase calculation unit 520 is constituted by a Fourier transform unit 5200, a negative frequency component zeroing unit 5201, a Fourier inverse transform unit 5202, and a deflection angle calculation unit 5203. FIG. 12 is a flowchart for describing the operation of the phase calculation unit 520 in a case in which Fourier transform is used.

The Fourier transform unit 5200 performs the Fourier transform of the input interference signal s(t) to find a frequency spectrum S(v) (step S200 of FIG. 12).

The negative frequency component zeroing unit 5201 finds a frequency spectrum $S_+(v)$ resulting from the zeroing of a negative frequency component of the frequency spectrum S(v) (step S201 of FIG. 12).

The Fourier inverse transform unit 5202 finds a complex signal $s_+(t)$ resulting from the Fourier inverse transform of the frequency spectrum $S_+(v)$ (step S202 of FIG. 12).

Then, the deflection angle calculation unit 5203 calculates the deflection angle of the complex signal $s_+(t)$ (an angle with respect to a real axis) as the phase $\theta'(t)$ of the interference signal s(t) (step S203 of FIG. 12).

Figure 13:
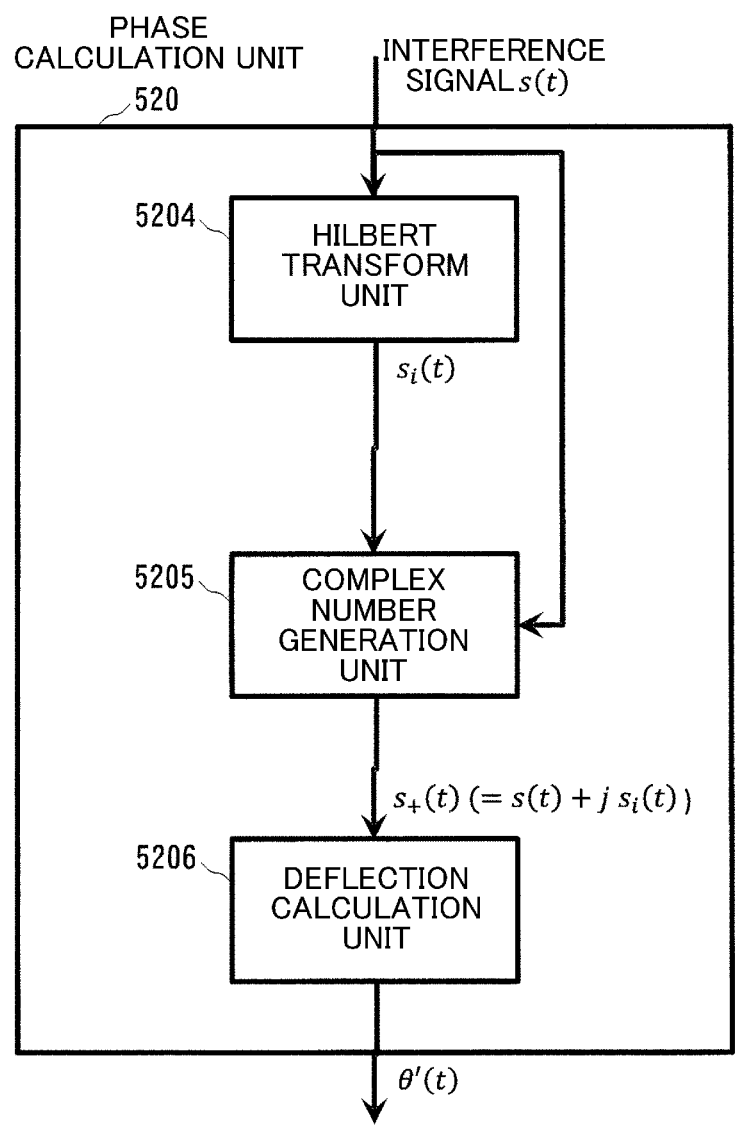
FIG. 13 is a diagram showing another configuration of the phase calculation unit of the wavelength calculation unit in an embodiment of the present invention.
Figure 14:
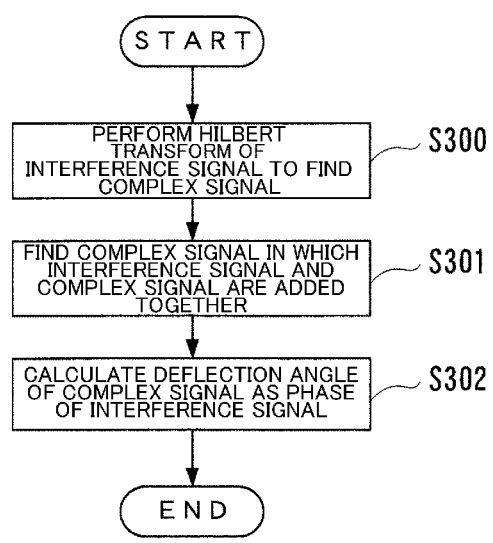
FIG. 14 is a flowchart for describing the operation of the phase calculation unit of FIG. 13.

FIG. 13 is a diagram showing the configuration of the phase calculation unit 520 in a case in which Hilbert transform is used. In this case, the phase calculation unit 520 is constituted by a Hilbert transform unit 5204, a complex number generation unit 5205, and a deflection angle calculation unit 5206. FIG. 14 is a flowchart for describing the operation of the phase calculation unit 520 in a case in which Hilbert transform is used.

The Hilbert transform unit 5204 performs the Hilbert transform of the input interference signal s(t) to find a complex signal $s_i(v)$ (step S300 of FIG. 14).

The complex number generation unit 5205 finds a complex signal $s_+(t)(=s(t)+js_i(t))$ in which the interference signal s(t) and the complex signal si(v) are added together (step S301 of FIG. 14). Here, j represents an imaginary unit.

The deflection angle calculation unit 5206 calculates the deflection angle of the complex signal $s_+(t)$ as the phase $\theta'(t)$ of the interference signal s(t) (step S302 of FIG. 14).

Here, the deflection angle calculation units 5203 and 5206 will be described in further detail although they get off the main subject of embodiments of the present invention. The deflection angle of a complex number is actually found for each discrete time $t_n$. Here, n represents an identifier for identifying time, and it is assumed that the time increases for each increment of n. Further, it is assumed that to represents an equal interval.

When the found deflection angle is represented by $\theta'_{init}(t_n)$, the deflection angle $\theta'_{init}(t_n)$ generally falls within the range of 0 to $2\pi$ or $-\pi$ to $\pi$. Note that the range of the deflection angle $\theta'_{init}(t_n)$ depends on a processing system that calculates a deflection angle. The convergence of a phase within the width of $2\pi$ like this is called phase wrapping processing.

However, since the relationship $\theta'(t)=2zk(t)$ is established as shown in expression (10) that will be described later, it is necessary to calculate the phase $\theta'(t)$ beyond the range of 0 to $2\pi$ or $-\pi$ to $\pi$. Therefore, the following calculation (I) to (VI) is performed. Such calculation is called phase connection or phase unwrapping. It is assumed that n of (I) to (VI) is 0 to N-1.

(I) Initialize a parameter p so that p=0
(II) $\theta'(t_n)=\theta_{init}(t_n)$ when n=0
(III) $\theta'(t_n)=\theta'_{init}(t_n)+2\pi p$ when n≠0 and $|\theta'_{init}(t_n)-\theta'_{init}(t_{n-1})|<\pi$
(IV) $\theta'(t_n)=\theta'_{init}(t_n)+2\pi p$ after the value of the parameter p is incremented by one when n≠0 and $\theta'_{init}(t_n)-\theta'_{init}(t_{n-1})\geq\pi$
(V) $\theta'(t_n)=\theta'_{init}(t_n)+2\pi p$ after the value of the parameter p is decremented by one when n≠0 and $\theta'_{init}(t_n)-\theta'_{init}(t_{n-1})\leq\pi$
(VI) The processing of (II) to (VI) is repeatedly performed while n is changed from 0 to N-1.

Just for reference, a method for calculating the phase $\theta'(t)$ from the interference signal s(t) obtained from the Mach-Zehnder interferometer 62 is based on the following principle. The interference signal s(t) is represented by the following expression.

Expression 10

$$s(t)=A\cos(2zk(t))=A\cos(\theta(t))(=$$
$$A\cos(2z(k'(t)+k_c))=A\cos((\theta'(t)+\theta_c))) \quad (10)$$

Here, A represents an amplitude, 2z represents the optical path length difference between the two arms of the Mach-Zehnder interferometer 62 shown in FIG. 8, and k(t) represents the wavenumber of the light from the wavelength sweeping light source 103. Further, $k(t)=k'(t)+k_c$ and $\theta(t)=\theta'(t)+\theta_c$ are established. $\theta_c$ represents the difference between an observation value $\theta'(t)$ of a phase and a true value $\theta(t)$ of the phase, and $k_c$ represents the difference between a wavenumber k'(t) calculated from the observation value $\theta'(t)$ of the phase and a true value k(t) of the wavenumber.

A reason for the occurrence of a difference like $k_c$ and $\theta_c$ is that $\theta'(t)$ before phase connection is a wrapped value $\theta'_{init}(t_n)$ (a value within the range of 0 to $2\pi$ or $-\pi$ to $\pi$) when $\theta'(t)$ is found from the complex number $s_+(t)$ in the above description.

That is, since $\theta'_{init}(t_n)$ is first calculated rather than the true value $\theta(t)$ of a deflection angle from the complex number $s_+(t)$ and then phase connection processing is performed on the basis of a phase at a certain time (time at n=0 in the processing of (I) to (VI)), the difference $\theta_c$ occurs. Due to the occurrence of the difference $\theta_c$ a difference $k_c$ between a true value and an observation value occurs as for the wavenumber k'(t) calculated from the phase $\theta'(t)$.

Note that the amplitude A of expression (10) generally fluctuates with time (that is, a time function) but is a constant for simplification here.

Expression (10) can be transformed as follows.

Expression 11

$$s(t)=A\cos(\theta(t))=\frac{A}{2}(e^{j\theta(t)}+e^{-j\theta(t)}) \quad (11)$$

The following expression is obtained when n $e^{-j\theta(t)}$ is removed from expression (11).

Expression 12

$$s_+(t)=\frac{A}{2}e^{j\theta(t)} \quad (12)$$

According to expression (12), the deflection angle of the complex number $s_+(t)$ is $\theta(t)$. Therefore, $\theta(t)$ can be obtained when the deflection angle of the complex number $s_+(t)$ is found.

Expression 13

$$\theta(t)=\arg(s_+(t)) \quad (13)$$

The complex number $s_+(t)$ is one obtained when the negative frequency component of the interference signal s(t) is zeroed, but can be found using Fourier transform or Hilbert transform like the configuration shown in FIG. 11 or FIG. 13.

Note that an example using the Mach-Zehnder interferometer is shown in the above description. However, it is only necessary to obtain the interference of light having passed through two optical paths having an optical path length difference, and a Michelson interferometer may be used. When a Fabry-Perot interferometer is used, one light is output. Therefore, a single-input photodetector (PD) is used as a light receiving element instead of a BPD, and a DC cut filter or high-pass filter is put between the PD and the signal capturing device 3 according to the circumstances.

Next, the relative wavenumber calculation unit 521 that calculates the relative wavenumber k'(t) of light from the phase $\theta'(t)$ of the interference signal s(t) will be described. Prior to the description, a reason for calculating a relative wavenumber k'(t) of light rather than the absolute wavenumber k(t) from the phase $\theta'(t)$ will be described.

From expression (10), $2zk(t)=\theta(t)$ can be seen. Therefore, it seems from expression (10) that the wavenumber k(t) is possibly found under the calculation of $k(t)=\theta(t)/2z$. However, the wavenumber k(t) is not actually found according to the calculation method. This is because, since expression (10) is established even if the phase $\theta(t)$ is set at 0 for each $2\pi 1$, there is a many-to-one relationship between the phase $\theta(t)$ and the wavenumber k(t) and thus the phase $\theta'(t)$ and the wavenumber k(t) found by the configurations of FIGS. 10 and 13 do not necessarily correspond to each other. That is, the phase $\theta(t)$ is not properly found by the configurations of FIGS. 10 and 13.

Accordingly, in the present embodiment, the relative wavenumber calculation unit 521 finds the relative wavenumber k'(t) based on $t=t_0$ rather than the wavenumber k(t) for the wavelength $\lambda(t)$ of the output light of the wavelength sweeping light source 103 according to the following expression.

Expression 14

$$k'(t) = \frac{\theta'(t)}{2z} \quad (14)$$

Next, the absolute wavenumber calculation unit 523 that calculates the absolute wavenumber k(t) that is the wavenumber $k_f$ at a time $t_f$ at which light passes through the wavelength filter 61 from the relative wavenumber k'(t) will be described. The peak time acquisition unit 522 that acquires the peak time $t_f$ from the filter signal $s_f(t)$ will be described later.

Figure 15A:
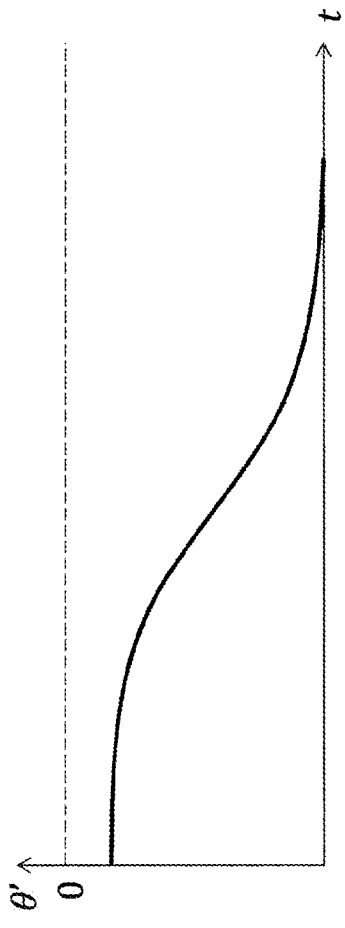
FIGS. 15A to 15C are diagrams for describing the relationship between an interference signal phase and a wavenumber.
Figure 15B:
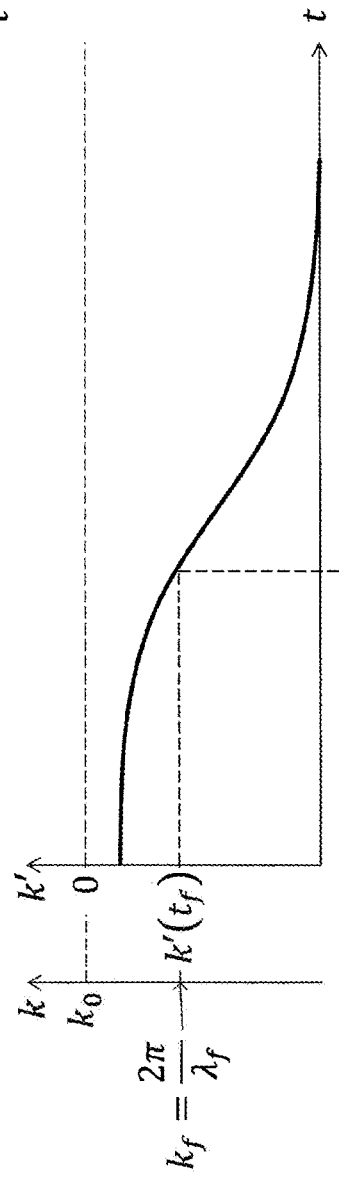
Figure 15C:
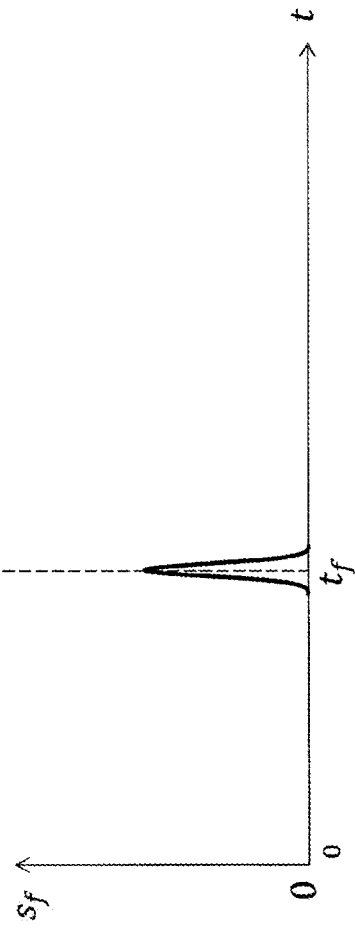

FIG. 15A shows the time change of the phase θ'(t). FIG. 15B shows the time changes of the relative wavenumber k'(t) and the absolute wavenumber k(t). FIG. 15C shows the time change of the filter signal sf(t). θ'(t$_0$) and k'(t$_0$) do not necessarily become 0 but become values within the range of 0 to 2 π or −π to π. When a time at which the peak of the filter signal $s_f(t)$ appears is $t_f$ and the wavelength of light passing through the wavelength filter 61 in the greatest amount is $\lambda_f$, the wavenumber $k_f$=k(t$_f$) corresponding to the peak time tf and the peak wavelength $\lambda_f$ is as follows.

Expression 15

$$k_f = k(t_f) = \frac{2\pi}{\lambda_f} \quad (15)$$

In addition, when the wavenumber corresponding to k'=0 is $k_0$ as shown in FIG. 15B, $k_0$ can be calculated as follows.

Expression 16

$$k_0 = k_f - k'(t_f) = \frac{2\pi}{\lambda_f} - k'(t_f) \quad (16)$$

The absolute wavenumber calculation unit 523 calculates the absolute wavenumber k(t) according to the following expression using the wavenumber $k_0$ obtained by expression (16).

Expression 17

$$k(t) = k'(t) + k_0 = k'(t) + \frac{2\pi}{\lambda_f} - k'(t_f) \quad (17)$$

Finally, the wavelength calculation processing unit 524 calculates the wavelength λ(t) of the output light of the wavelength sweeping light source 103 from the wavenumber k(t) according to the following expression.

Expression 18

$$\lambda(t) = \frac{2\pi}{k(t)} \quad (18)$$

The peak time acquisition unit 522 that has not been described above will be described. As a method for deriving the peak time $t_f$, there is a method in which the peak of the filter signal $s_f(t)$ is searched for to acquire the peak time $t_f$.

However, since the time t is a discrete value in the present embodiment, the filter signal $s_f(t)$ also becomes discrete data. Therefore, when the peak of the filter signal $s_f(t)$ is searched for, the peak time $t_f$ can be obtained only with the accuracy of a sampling cycle.

In order to more precisely measure the peak time $t_f$, it is presumed that fitting using a function is performed on the data of a prescribed number in the vicinity of the peak of the filter signal $s_f(t)$ to acquire the peak time $t_f$. For example, when fitting is performed using a quadratic function $s=a_2t^2+a_1t+a_0$, it is presumed that the peak time acquisition unit 522 calculates the peak time $t_f$ as $t_f=-a_1/(2a_2)$.

Further, the peak time acquisition unit 522 may search for the peak of the filter signal $s_f(t)$ through interpolation between the data of the filter signal $s_f(t)$ to obtain the peak time $t_d$. As a method for interpolating the filter signal $s_f(t)$, a method such as a method in which the Fourier transform of the filter signal $s_f(t)$ is performed to find a frequency spectrum, zero is padded as the high frequency component of the frequency spectrum (zero padding), and the Fourier inverse transform of the frequency spectrum is performed to obtain the interpolated filter signal $s_f(t)$ and spline interpolation is presumed.

Further, if the function fitting of the vicinity of the peak of the filter signal $s_f(t)$ is performed to obtain the peak time $t_f$ after the above interpolation, accuracy is more improved.

The peak time $t_f$ of the filter signal $s_f(t)$ obtained by the interpolation or the function fitting described above does not generally match the sampling time of the signal capturing device 3 of FIG. 8.

However, the data of the relative wavenumber k'(t) of light exists in a discrete manner only at its sampling time. Therefore, even if the absolute wavenumber calculation unit 523 in FIG. 9 makes an attempt to obtain k'(t$_f$) to find the wavenumber $k_0$, the peak time $t_f$ does not necessarily match the discrete time t of the data of the wavenumber k'(t). In this case, the peak time acquisition unit 522 may only calculate the wavenumber k'(t$_f$) through interpolation using wavenumbers k'(t) prior to and subsequent to the peak time $t_f$. For example, it is presumed that linear interpolation is performed using two wavenumbers k'(t) adjacent to the peak time $t_f$ of the filter signal $s_f(t)$.

The method for finding the coordinates (L$_0$, x$_0$) of the deflection origin of the light deflector 100 (the deviation amount between the origin O of the world coordinate system and the origin O' of the stage coordinate system) and the method for finding the wavelength λ(t) of the output light of the wavelength sweeping light source 103 are described above. Next, a method for finding the incident angle α of an output light beam from the wavelength sweeping light source 103 onto the diffraction grating 102 and a method for finding the angle θ$_G$ formed by a line perpendicular to the surface of the diffraction grating 102 and the L-axis will be described.

Figure 16:
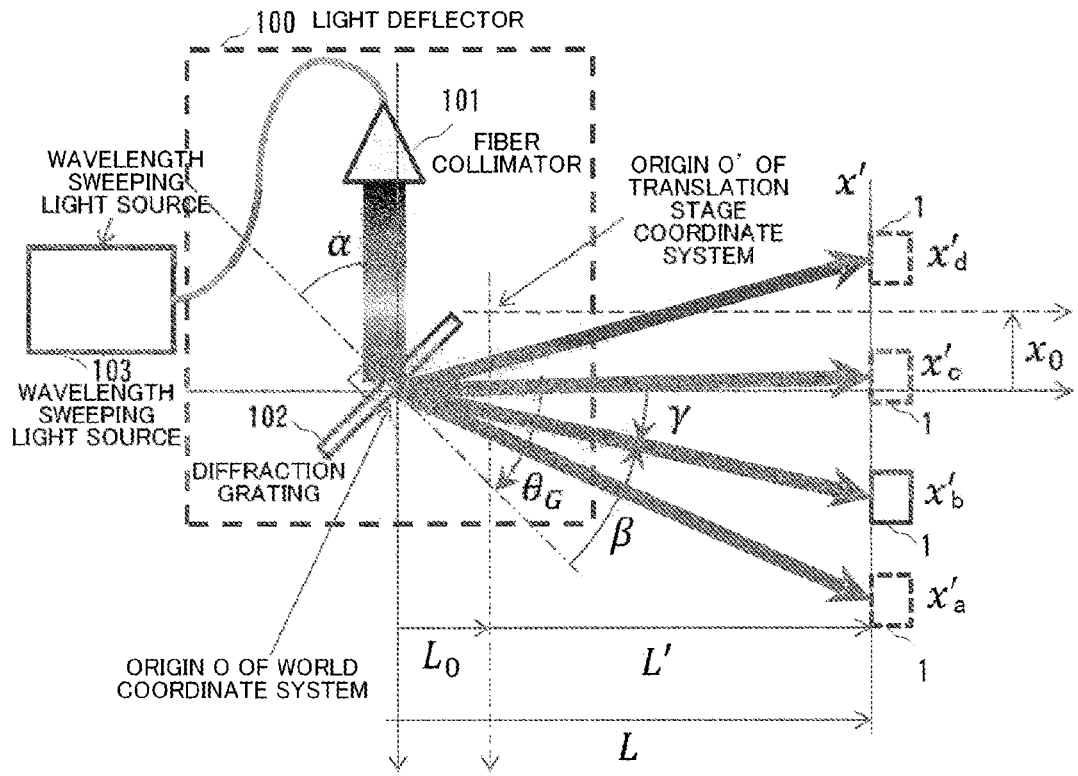
FIG. 16 is a diagram for describing a method for finding an incident angle of the output light beam of the wavelength sweeping light source on a diffraction grating and a method for finding an angle formed by the surface of the diffraction grating and an L-axis.

Although FIG. 16 is almost the same diagram as FIG. 1, FIG. 16 shows a state in which the position of the PD 1 is moved parallel to an x' coordinate axis. Like this, only coordinates x' are changed with coordinates L' fixed to obtain each output signal S$_p$(t) of the PD 1.

Figure 17:
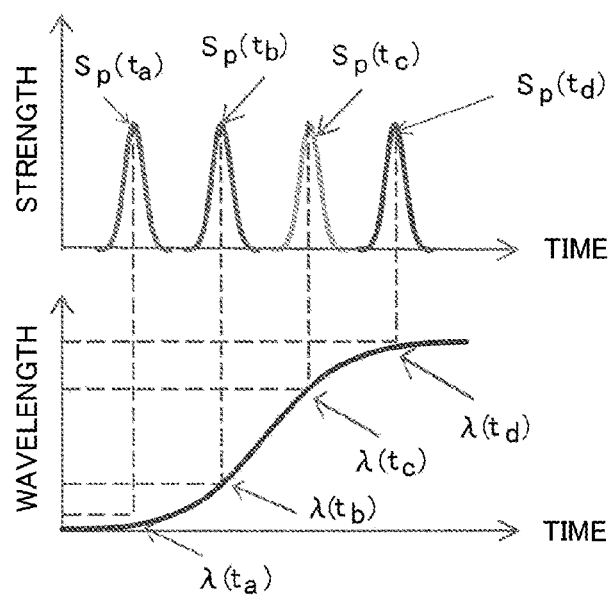
FIG. 17 is a diagram showing the waveform of the output signal of the photodetector and the wavelength of the output light of the wavelength sweeping light source in an embodiment of the present invention.

FIG. 17 is a diagram showing output signals S$_p$(t$_a$), S$_p$(t$_b$), S$_p$(t$_c$), and S$_p$(t$_d$) of the PD 1 and wavelengths λ(t$_a$), λ(t$_b$), λ(t$_c$), and λ(t$_d$) of the output light of the wavelength sweeping light source 103 obtained from the output signals S$_p$(t$_a$), S$_p$(t$_b$), S$_p$(t$_c$), and S$_p$(t$_d$) when the PD 1 is positioned at positions x'$_a$, x'$_b$, x'$_c$, and x'$_d$ shown in FIG. 16 at times t$_a$, t$_b$, t$_c$, and t$_d$.

Figures 18A, 18B:
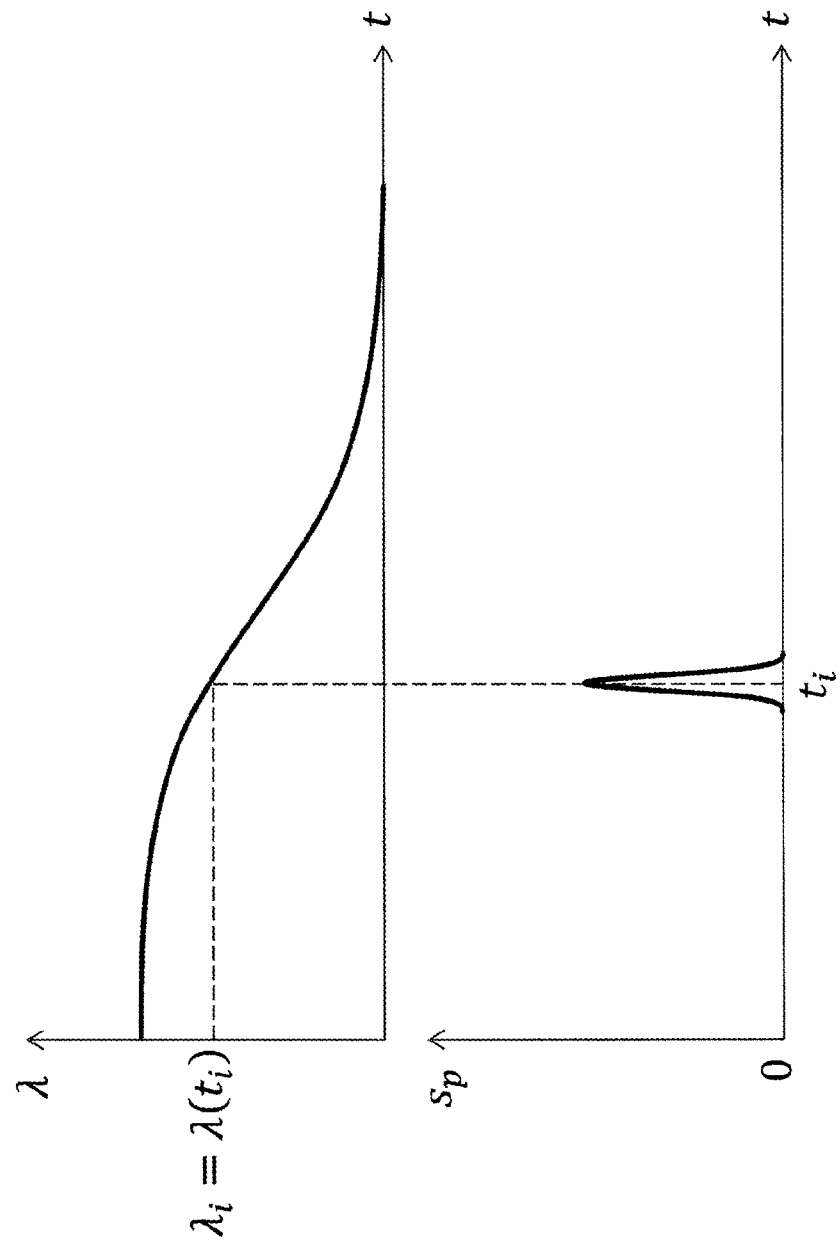
FIGS. 18A and 18B are diagrams for describing a method for finding the wavelength of the output light of the wavelength sweeping light source from the output signal of the photodetector in an embodiment of the present invention.

FIGS. 18A and 18B are diagrams for describing a method for finding the wavelength λ of the output light of the wavelength sweeping light source 103 from the output signal $S_p(t)$ when the PD 1 is positioned at the coordinates $(L_i, x_i)$. FIG. 18A shows the wavelength λ(t) calculated by the wavelength calculation unit 52 of the signal processing device 5. FIG. 18B shows the output signal $S_p(t)$ of the PD 1.

The wavelength calculation unit 53 of the signal processing device 5 acquires the output signal $S_p(t)$ of the PD 1 when the PD 1 is positioned at the coordinates $(L_i, x_i)$, searches for the peak position of the output signal $S_p(t)$, and sets the peak time of the peak position as $t_i$. Then, the wavelength calculation unit 53 finds the wavelength $\lambda(t_i)$ where $t=t_i$ from the wavelength λ(t) calculated by the wavelength calculation unit 52, and sets $\lambda(t_i)$ as the wavelength $\lambda_i$ of the output light of the wavelength sweeping light source 103 when the PD 1 is positioned at the coordinates $(L_i, x_i)$.

As a method for obtaining the peak time $t_i$ of the output signal $S_p(t)$ of the PD 1, a method for obtaining the peak time $t_f$ of the above filter signal $s_f(t)$ can be used. Since the method is the same as the above, its description will be omitted.

In this manner, the PD 1 is moved parallel to the x' coordinate axis by the biaxial translation automatic stage 2 controlled by the stage control unit 50 to acquire the coordinates $(L_i, x_i)$ of the PD 1 and the measurement data $(L'_i, x_i, \lambda_i)$ (i=1 to $N_m$) of the wavelength $\lambda_i$ of the output light of the wavelength sweeping light source 103 at each of the $N_m$ positions. Note that the value of $L'_i$ of each measurement data $(L'_i, x'_i, \lambda_i)$ (i=1 to $N_m$) is the same since PD 1 is moved with the coordinates L' fixed as described above. Further, the coordinates $(L_i, x_i)$ of the PD 1 can be obtained from the stage control unit 50.

Meanwhile, the following relational expression can be established when expressions (2) to (4) are integrated with each other.

Expression 19

$$x'+x_0=(L'+L_0)\tan(\theta_G+\sin^{-1}(\sin\alpha-Nm\lambda(t))) \quad (19)$$

The parameter calculation unit 54 of the signal processing device 5 calculates the incident angle α of the output light beam of the wavelength sweeping light source 103 onto the diffraction grating 102 and the angle $\theta_G$ formed by the line perpendicular to the surface of the diffraction grating 102 and the L-axis from expression (19) on the basis of the acquired data $(L'_i, x'_i, \lambda_i)$ (i=1 to $N_m$) and the coordinates $(L_0, x_0)$ of the deflection origin of the light deflector 100 that is calculated in advance by the deflection origin calculation unit 51. Note that it goes without saying that $x'_i$ of the measurement data is substituted into x' of expression (19), $L'_i$ of the measurement data is substituted into L' of expression (19), and $\lambda_i$ of the measurement data is substituted into λ(t) of expression (19).

Since there is generally a measurement error or the like, it is presumed that the incident angle α and the angle $\theta_G$ with which expression (19) is completely established hardly exist. Therefore, the parameter calculation unit 54 of the signal processing device 5 calculates the incident angle α of the output light beam of the wavelength sweeping light source 103 onto the diffraction grating 102 and the angle $\theta_G$ formed by the line perpendicular to the surface of the diffraction grating 102 and the L-axis by function fitting in which the function best fitted to the acquired measurement data $(L'_i, x'_i, \lambda_i)$ (i=1 to $N_m$), the coordinates $(L_0, x_0)$ of the deflection origin of the light deflector 100, the number N of the ruled lines of the diffraction grating 102, and the diffraction order m is found. As an example of such function fitting, a Newton-Raphson method, a steepest descent method, a Levenberg-Marquardt method, or the like can be used.

Figure 19:
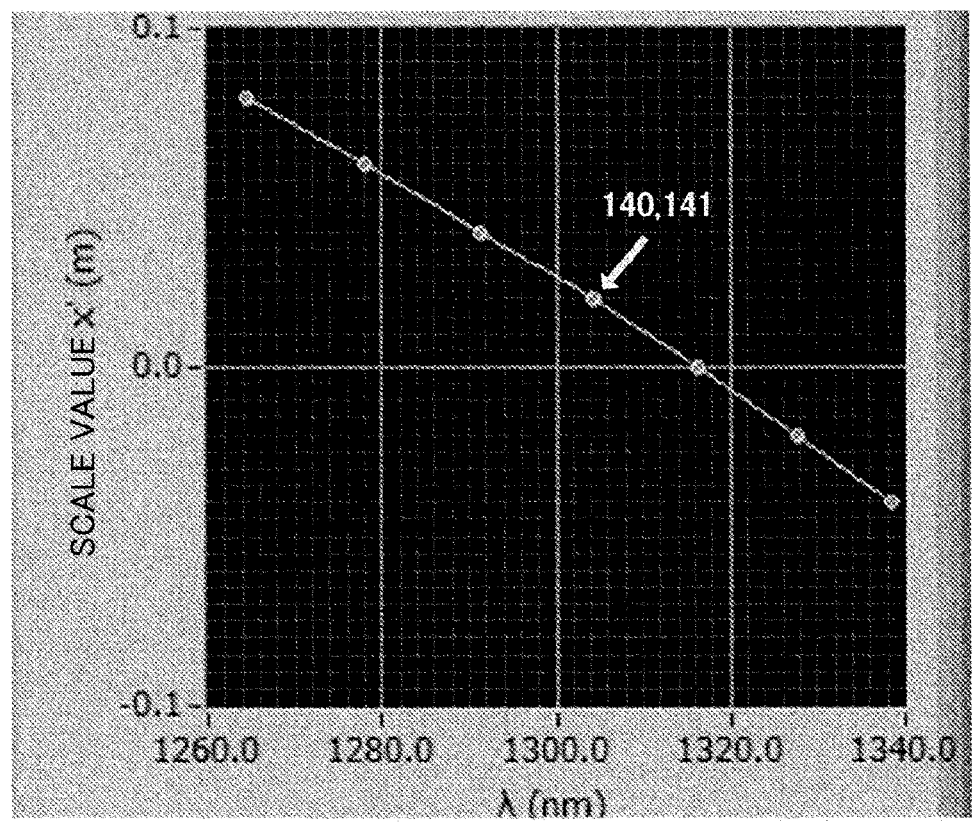
FIG. 19 is a diagram showing results obtained when the incident angle of the output light beam of the wavelength sweeping light source onto the diffraction grating and an angle formed by the surface of the diffraction grating and the L-axis using a Levenberg-Marquardt method in an embodiment of the present invention.

FIG. 19 shows results obtained when α and $\theta_G$ are calculated using the Levenberg-Marquardt method. In FIG. 19, a horizontal axis shows a wavelength, a vertical axis shows coordinates x', 140 shows measurement data, and 141 shows a fitting result. Here, it is assumed that the number N of the ruled lines of the diffraction grating 102 is 1201, the diffraction order m is 1, $x_0$ is −11.1295 mm, and $L_0$ is 31.1404 mm.

The example of FIG. 19 shows the fitting results obtained when $L_i$=510 mm($L'_i$=478.8596 mm), and shows the fact that the measurement data of $(L'_i, x'_i, \lambda_i)$ and the value of calculated by substituting the calculated α, $\theta_G$, and $(L'_i, \lambda_i)$ into expression (19) almost match each other, and that fitting goes well.

TABLE 1

| L(cm) | $\theta_G$(deg) | α(deg) |
|---|---|---|
| 11 | 64.0474 | 43.46563 |
| 31 | 63.94833 | 43.54618 |
| 51 | 64.03323 | 43.49067 |
| Average | 64.00965 | 43.50082 |

Further, Table 1 shows results obtained when α and $\theta_G$ are each calculated using the Levenberg-Marquardt method with respect to the group of the measurement data of $(L'_i, x'_i, \lambda_i)$ in a case in which $L_i$ is changed to no mm, 310 mm, or 510 mm. The values of a and $\theta_G$ show slight differences. In order to further increase accuracy in calculating α and $\theta_G$, it may be possible to find α and $\theta_G$ with respect to a plurality of the groups of the data of $L_i$ and average the same. In the table, the average values of α and $\theta_G$ of the above three groups are also shown.

In the manner described above, the present embodiment makes it possible to exactly measure the incident angle α of the output light beam of the wavelength sweeping light source 103 onto the diffraction grating 102 and exactly find the relationship between the time t and the emission angle β of the diffraction grating 102.

Figure 20:
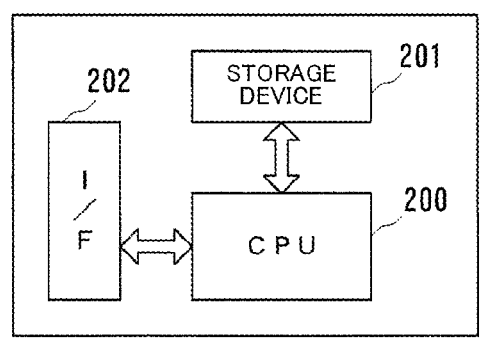
FIG. 20 is a block diagram showing the configuration of a computer that realizes the signal processing device according to an embodiment of the present invention.

The signal processing device 5 described in the present embodiment can be realized by a computer including a CPU (Central Processing Unit), a storage device, and an interface and a program that controls the hardware resources. FIG. 20 shows a configuration example of the computer. The computer includes a CPU 200, a storage device 201, and an interface device (hereinafter abbreviated as an I/F) 202. The signal capturing device 3, the stage driver 4, or the like is connected to the I/F 202. In such a computer, a light deflector parameter measurement program for realizing the light deflector parameter measurement method of embodiments of the present invention is stored in the storage device 201. The CPU 200 performs the processing described in the present embodiment according to the program stored in the storage device 201. Note that it is also possible to provide the program via a network.

INDUSTRIAL APPLICABILITY

Embodiments of the present invention can be applied to a technology to measure the parameters of a light deflector.

REFERENCE SIGNS LIST 1, 64 Photodetector
2 Biaxial translation automatic stage
3 Signal capturing device
4 Stage driver
5 Signal processing device
50 Stage control unit
51 Deflection origin calculation unit
52, 53 Wavelength calculation unit
54 Parameter calculation unit
60 Coupler
61 Wavelength filter
62 Mach-Zehnder interferometer 62
63 Balanced photodetector
100 Light deflector
101 Fiber collimator
102 Diffraction grating
103 Wavelength sweeping light source
520 Phase calculation unit
521 Relative wavenumber calculation unit
522 Peak time acquisition unit
523 Absolute wavenumber calculation unit
524 Wavelength calculation processing unit
5200 Fourier transform unit
5201 Negative frequency component zeroing unit
5202 Fourier inverse transform unit
5203 Deflection calculation unit
5204 Hilbert transform unit
5205 Complex number generation unit
5206 Deflection angle calculation unit

The invention claimed is:

1. A light deflector parameter measurement device comprising:
  a first photodetector configured to receive output light from a light deflector configured to change an emission angle of output light from a diffraction grating according to a wavelength of output light of a wavelength sweeping light source that is incident onto the diffraction grating;
  a stage configured to move the first photodetector to a plurality of positions along a direction of a first axis perpendicular to a groove direction of the diffraction grating of the light deflector;
  a first wavelength calculator configured to calculate the wavelength of the output light of the wavelength sweeping light source of the light deflector at each of the plurality of positions;
  a second wavelength calculator configured to calculate a wavelength of the light received from the light deflector by the first photodetector positioned by the stage based on an output signal of the first photodetector and the wavelength calculated by the first wavelength calculator; and
  a parameter calculator configured to calculate an incident angle a of the output light of the wavelength sweeping light source onto the diffraction grating and an angle θG, which is formed by a second axis that is perpendicular to the groove direction of the diffraction grating and perpendicular to the first axis and a line perpendicular to a surface of the diffraction grating, by performing fitting so that coordinates of the first photodetector that are obtained for each position of the first photodetector positioned by the stage and the wavelength calculated by the second wavelength calculator conform to a prescribed relational expression.

2. The light deflector parameter measurement device according to claim 1, further comprising:
  a deflection origin calculator configured to calculate coordinates of a deflection origin of the light deflector;
  wherein the relational expression is an expression in which the coordinates of the first photodetector, the wavelength of the output light from the light deflector, the incident angle α, the angle θG, the coordinates of the deflection origin of the light deflector, a number of ruled lines of the diffraction grating, and a diffraction order are associated with each other;
  wherein the stage is configured to move, before moving the first photodetector along the direction of the first axis to find the incident angle α and the angle θG, the first photodetector along the first axis and the second axis so that a plurality of the coordinates of the first photodetector can be acquired with respect to one deflection angle of the light deflector for each different deflection angle; and
  wherein the deflection origin calculator is configured to find linear approximations obtained from the plurality of the coordinates of the first photodetector with respect to the same deflection angle of the light deflector for each deflection angle and calculate coordinates of an intersecting point of the linear approximations as the coordinates of the deflection origin of the light deflector.

3. The light deflector parameter measurement device according to claim 2, further comprising a wavelength acquisition optical system configured to acquire the wavelength of the output light of the wavelength sweeping light source, wherein the wavelength acquisition optical system includes:
  a coupler configured to distribute the light from the wavelength sweeping light source;
  an interferometer configured to receive a first output light of the coupler and output an interference signal by causing light that propagates through two optical paths having a different optical length to interfere with each other;
  a wavelength filter configured to cause light having a specific wavelength of a second output light of the coupler to pass therethrough; and
  a second photodetector configured to output a signal obtained by photoelectrically converting the light that passes through the wavelength filter as a filter signal.

4. The light deflector parameter measurement device according to claim 3, wherein the first wavelength calculator is configured to calculate the wavelength of the output light of the wavelength sweeping light source at each of the plurality of positions based on the interference signal, the filter signal, and a prescribed maximum transmission wavelength of the wavelength filter.

5. The light deflector parameter measurement device according to claim 4, wherein the first wavelength calculator includes:
  a phase calculator configured to calculate a phase of the interference signal;
  a relative wavenumber calculator configured to calculate a relative wavenumber of light from the phase of the interference signal;
  a peak time acquirer configured to acquire a peak time of the filter signal;
  an absolute wavenumber calculator configured to calculate an absolute wavenumber from the maximum transmission wavelength of the wavelength filter and the peak time; and a wavelength calculation processor configured to calculate the wavelength of the output light of the wavelength sweeping light source from the absolute wavenumber.

6. A light deflector parameter measurement method for measuring a parameter of a light deflector, the method comprising:

moving a photodetector that receives output light from the light deflector that changes an emission angle of output light from a diffraction grating according to a wavelength of output light of a wavelength sweeping light source that is incident onto the diffraction grating to a plurality of positions along a direction of a first axis perpendicular to a groove direction of the diffraction grating of the light deflector by a stage;

calculating the wavelength of the output light of the wavelength sweeping light source of the light deflector at each of the plurality of positions;

calculating a wavelength of the light received from the light deflector by the photodetector positioned by the stage based on an output signal of the photodetector and the calculated wavelength of the output light; and calculating an incident angle a of the output light beam of the wavelength sweeping light source onto the diffraction grating and an angle θG, which is formed by a second axis that is perpendicular to the groove direction of the diffraction grating and perpendicular to the first axis and a line perpendicular to a surface of the diffraction grating, by performing fitting so that coordinates of the photodetector that are obtained for each position of the photodetector positioned by the stage and the calculated wavelength of the light received from the light deflector conform to a prescribed relational expression.

7. The light deflector parameter measurement method according to claim 6, wherein the relational expression is an expression in which the coordinates of the photodetector, the wavelength of the output light from the light deflector, the incident angle α, the angle θG, the coordinates of the deflection origin of the light deflector, a number of ruled lines of the diffraction grating, and a diffraction order are associated with each other.

8. The light deflector parameter measurement method according to claim 7, further comprising:

prior to moving the photodetector to the plurality of positions, moving the photodetector along the first axis and the second axis so that a plurality of the coordinates of the photodetector can be acquired with respect to one deflection angle of the light deflector for each different deflection angle; and finding a linear approximation obtained from the plurality of the coordinates of the photodetector with respect to the same deflection angle of the light deflector for each deflection angle and calculating coordinates of an intersecting point of linear approximations as the coordinates of the deflection origin of the light deflector.

9. A non-transitory computer-readable medium storing a light deflector parameter measurement program including instructions that, when executed by a processor, causes a computer to perform the method according to claim 8.

* * * * *